United States Patent [19]
Miyazawa et al.

[11] Patent Number: 5,769,206
[45] Date of Patent: Jun. 23, 1998

[54] CONTINUOUS UNLOADER

[75] Inventors: Isao Miyazawa, Urawa; Yoichi Seki, Aichi; Seizaburo Suda, Aichi; Yoshinori Yamada, Aichi, all of Japan

[73] Assignee: Ishikawajima-Harima Heavy Industries Co. Ltd., Tokyo, Japan

[21] Appl. No.: 572,216

[22] Filed: Dec. 13, 1995

[30] Foreign Application Priority Data

| Jun. 16, 1995 | [JP] | Japan | 7-150460 |
| Jul. 14, 1995 | [JP] | Japan | 7-179031 |
| Jul. 14, 1995 | [JP] | Japan | 7-179032 |
| Jul. 18, 1995 | [JP] | Japan | 7-181465 |
| Jul. 18, 1995 | [JP] | Japan | 7-181466 |

[51] Int. Cl.$^6$ .................................................. B65G 17/36
[52] U.S. Cl. ........................ 198/712; 198/709; 414/141.1
[58] Field of Search .................................... 198/701, 708, 198/709, 712; 414/140.9, 141.1, 141.2, 142.5

[56] References Cited

U.S. PATENT DOCUMENTS

| 1,421,787 | 7/1922 | Kininmonth . | |
| 3,583,582 | 6/1971 | Ostarello | 414/141.1 X |
| 4,261,678 | 4/1981 | Kruger | 414/141.1 X |
| 4,799,584 | 1/1989 | Hartsuiker et al. | 198/709 |
| 4,830,177 | 5/1989 | Baba et al. | 198/712 X |
| 4,890,719 | 1/1990 | Yagi et al. | 414/141.1 X |
| 5,409,343 | 4/1995 | Friedrich | 198/709 X |

FOREIGN PATENT DOCUMENTS

| D. 401406 | 12/1990 | European Pat. Off. . | |
| 428907 | 5/1926 | Germany . | |
| 596236 | 4/1934 | Germany . | |
| 4-317928 | 9/1992 | Japan . | |
| 2081203 | 2/1982 | United Kingdom . | |
| 2189207 | 10/1987 | United Kingdom | 414/141.1 |

OTHER PUBLICATIONS

Search Report of the European Patent Office for Application EP95118709.

*Primary Examiner*—James R. Bidwell
*Attorney, Agent, or Firm*—Rader, Fishman & Grauer PLLC

[57] ABSTRACT

A continuous unloader has a vertically extending elevator portion having a bottom and a top, a digging portion extending horizontally from the bottom of the elevator portion and a return portion extending from the top of the elevator portion to a free end of the digging portion thereby forming an endless route. The continuous unloader further includes: an endless bucket conveyer extending through the endless route; and a plurality of drive components provided on the bucket conveyer with predetermined intervals in the direction of circulation. The drive components are synchronously operated so that the conveyer be circularly driven.

5 Claims, 21 Drawing Sheets

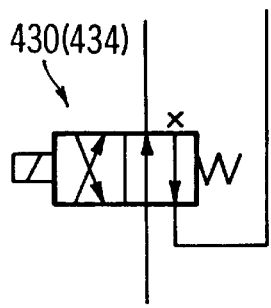
FIG. 19
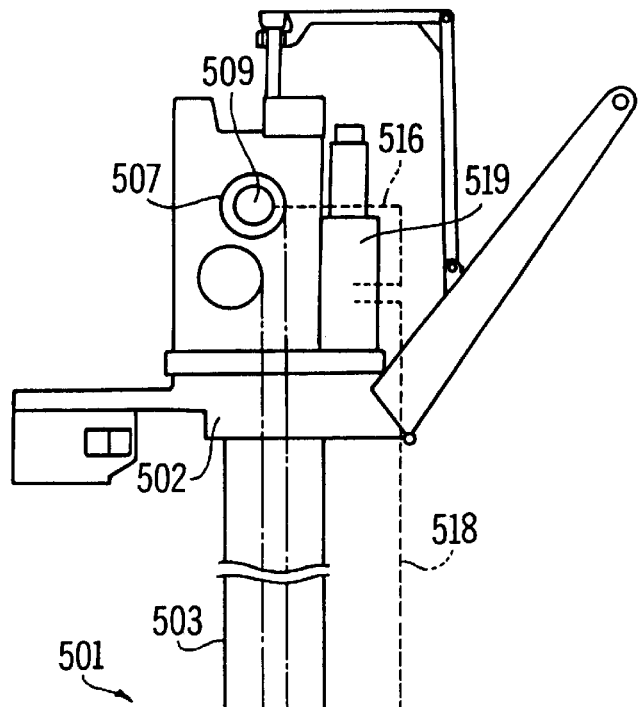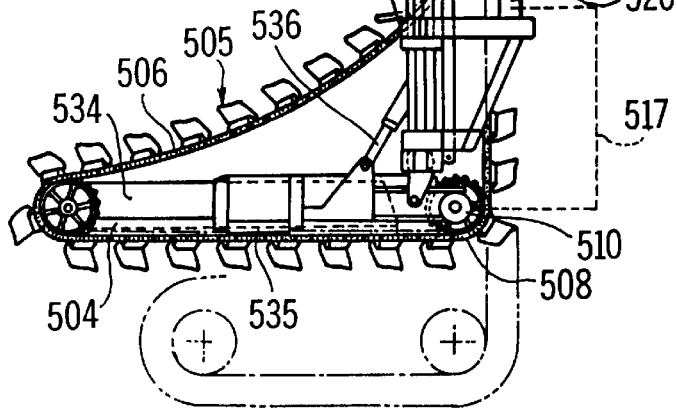
FIG. 20

CONTINUOUS UNLOADER

BACKGROUND OF THE INVENTION

1. Technical Field

This invention relates to a continuous unloader for digging bulk cargoes in a ship and lifting them up with a circularly driven bucket conveyer.

2. Background of Art

As for an unloader for lifting up powder or bulk cargoes (such as coal, iron ore) loaded in a ship, a continuous unloader which continuously digs the bulk cargoes in the ship and lifts them up with a circularly driven bucket conveyer is employed.

As shown in FIG. 22 of the accompanying drawings, the continuous unloader of such a type includes: a boom 3 supported on a traveling component 2 which travels along a dock, wherein free slewing and derrick motions of the boom 3 are allowed; an elevator casing 5 supported at the end of the boom 3 by way of a top support frame 4, wherein the elevator casing plums down from the boom 3 and can freely rotate about its vertical axis; an elevator portion 6 provided along the elevator casing 5; a digging portion 7 horizontally extending from the bottom of the elevator portion 6; a bucket conveyer 8 which circulates through digging portion 7 and the elevator portion 6; and a drive component 9 which is provided at the upper part of the elevator portion 6 and drives the bucket conveyer 8.

When the cargoes 11 in the ship 10 is lifted up, the bucket conveyer 8 is circularly driven by the drive component 9. The bulk cargoes 11 in the ship 10 is then dug by buckets 12 of the digging portion 7 of the bucket conveyer 8, lifted up by the elevator portion 6, and transferred from the buckets 12 onto a boom conveyer 13 when the buckets are turned over at the upper part of the elevator portion 7. Then the bulk cargoes 11 are unloaded to a dock 1.

As ships are increasing their size recently, an unloader with higher performance is necessitated and thus a bucket conveyer 8 having a large loading capacity tends to be employed. However, such increased loading on the bucket conveyer 8 creates a large tension on the drive chain 14 which lifts the bucket conveyer 8 up because the bucket conveyer 8 of the prior continuous unloader is driven by the drive component 9 at only one site. Therefore, the strength of the drive chain 14 cannot be maintained without enlarging its size in the prior art.

Enlarging the size of the drive chain 14 leads to the weight increase of the whole system, resulting in more cost. Further, enlarging the chain size inevitably lowers circulation velocity of the chain 14 and thus decreases unloading capacity. It further causes a problem of increased noise of the drive chain 14.

SUMMARY OF THE INVENTION

An object of the present invention contrived in consideration with the problems above is to provide a continuous unloader which is able to decrease tensions on a drive chain and thus avoids becoming larger even if its bucket conveyer has a large loading capacity.

According to the first aspect of the present invention, a continuous unloader in which a bucket conveyer circulates through an elevator portion formed in the vertical direction and a digging portion horizontally extending from a bottom end of the elevator portion includes a plurality of drive components. These drive components, provided at appropriate positions of the bucket conveyer with predetermined intervals along the direction of circulation, operate synchronously so that the chains of the bucket conveyer be circularly driven.

In the arrangement above, when bulk cargoes and the like are dug and transferred, at tension on the drive chain of the bucket conveyer is decreased since the tension is shared by a plurality of the drive components which are synchronously driven. Thus, the drive chain can avoid becoming larger.

The drive components may be provided at first sprockets arranged at the top of the elevator portion and at second sprockets arranged at the corner portion, respectively, wherein the corner portion connects the elevator portion and the digging portion. The arrangement ensures that the drive chain is taken up by the first sprocket provided at the top of the elevator portion and the second sprocket provided at the corner portion, eliminating occurrence of drive slip.

Alternatively, the drive portions may be respectively provided at the first sprocket arranged at the top of the elevator portion and at second sprockets arranged at an upwardly bent end of the digging component connecting the elevator and the digging components, wherein the bend of the digging component is provided so that the conveyer can have a sufficient taken-up angle against the digging component. This arrangement also ensures that the drive chain is taken up by the first sprocket and the second sprocket, eliminating drive slip.

Alternatively, the drive components may respectively be provided at each of the first sprockets provided at the top of the elevator portion and at second sprockets provided above the corner portion which connects the elevator portion and the digging portion. This arrangement allows a chain tension caused by the first sprockets and a chain tension caused by the second sprockets to be substantially equal, by appropriately adjusting the position (height) of the second sprockets.

In the case above in which the second sprockets are provided above the corner portion which connects the elevator portion and the scratch portion, chain guides or idle sprockets for holding the drive chain of the bucket conveyer onto the second sprockets may be provided near the fourth sprockets. This arrangement ensures that the drive chains arc taken up by the fourth sprockets, eliminating occurrence of drive slip.

According to the second aspect of the present invention, a continuous unloader wherein each of left and right endless drive chains are taken up in a way that it can freely circulate through both the elevator portion formed along the vertical axis and the digging portion horizontally extending from the bottom of the elevator portion is provided with a plurality of the drive components at appropriate positions on the drive chain with predetermined intervals between each other along the direction of circulation. The second aspect of the present invention allows the left and right chains of the drive component which receives the largest load to have a common shaft so that both chains can be synchronously driven, while each of the left and right chains of the other drive component(s) has an independent shaft and is independently driven.

In the arrangement above, the left and right drive chains of the bucket conveyer are synchronously circulated because they are synchronously driven by the common shaft of the driving component which receives the largest load among the plurality of the drive components. Additionally, if the lengths of the left and the right chains are made different because of extension/slack and the like, the left and the right tensions are still equal since each chain is independently driven by its own shaft at the rest of the drive components.

According to the third aspect of the present invention, a continuous unloader having a bucket conveyer which is circularly driven at two or more drive positions includes: a plurality of drive means provided at each of the drive positions for driving the bucket conveyers; a brake means provided for stopping the bucket conveyer; a sensor for detecting transfer state of the bucket conveyer circularly driven by the drive means; and a controller for stopping the drive means and making the brake means operate when it detects abnormality of the transfer state after processing signals from the sensor.

In the arrangement above, when abnormality of the transfer state of the circulating bucket conveyer is detected, the controller stops the drive means and then the brake means stops the bucket conveyer, thus preventing a reversed circulation of the bucket conveyer which would result in dropping of the cargoes.

According to the fourth aspect of the present invention, the continuous unloader includes: a bucket conveyer circularly driven at two or more drive positions; at least one hydraulic motor provided at each of the drive positions; an oil pressure supply means for appropriately supplying oil pressure to the hydraulic motor(s) by way of a hydraulic circuit; and a switch means for switching on/off the hydraulic circuit in accordance with weight of the load being transferred, in order reduce the number of the hydraulic motors supplying oil pressure.

In the arrangement above, when the load is relatively light, the switch means switches the hydraulic circuit into a pattern which reduces the number of the hydraulic motors supplying oil pressure. Then the oil which cannot flow into the closed hydraulic motor(s) rushes into the rest of the hydraulic motors, increasing the quantity of oil flow and the rotational velocity of the hydraulic motors. This eventually increases the circulation velocity of the bucket conveyer. Since the arrangement above allows the circulation velocity of the bucket conveyer to be increased when the load being transferred is relatively light, the operational efficiency can be improved.

According to the fifth aspect of the present invention, the continuous unloader includes: the hydraulic motors for circularly driving the bucket conveyer wherein the motors are provided at the upper part and the lower part of the bucket conveyer; an intermediate tank for temporarily reservoiring drain which leaks from the motors, wherein the intermediate tank is provided near the lower hydraulic motor and the drain is forcibly pushed upward due to its own drain pressure; and a drain pump for pressurizing the drain in the intermediate tank so that the drain go to the main tank, wherein the main tank is located at a higher position than the intermediate tank.

In the arrangement above, the drain which leaks from the lower hydraulic motor is at first transferred into the intermediate tank provided near the lower hydraulic motor due to the drain pressure, and the drain in the intermediate tank is then pressurized by the drain pump so that it go to the main tank which is located at a higher position than the intermediate tank. Thus, only a relatively small head (drain) pressure resulting from the height between the lower hydraulic motor and the intermediate tank works on the lower hydraulic motor.

BRIEF DESCRIPTION OF THE DRAWINGS

FIG. 4($b$) shows tensions on a drive chain expected in the preferred embodiment and the first modified embodiment.

FIG. 4($c$) shows tensions on a drive chain expected in the second modified embodiment.

FIG. 19 shows another symbol which represents the first or the second switch valve shown in FIG. 15, FIG. 17 and FIG. 18.

FIG. 20 is a side view of a continuous unloader, showing a preferred embodiment of the fifth aspect of the present invention.

DESCRIPTION OF THE PREFERRED EMBODIMENTS

A preferred embodiment of the first aspect of the present invention is herein described in detail according to the accompanying drawings.

Figure 1:
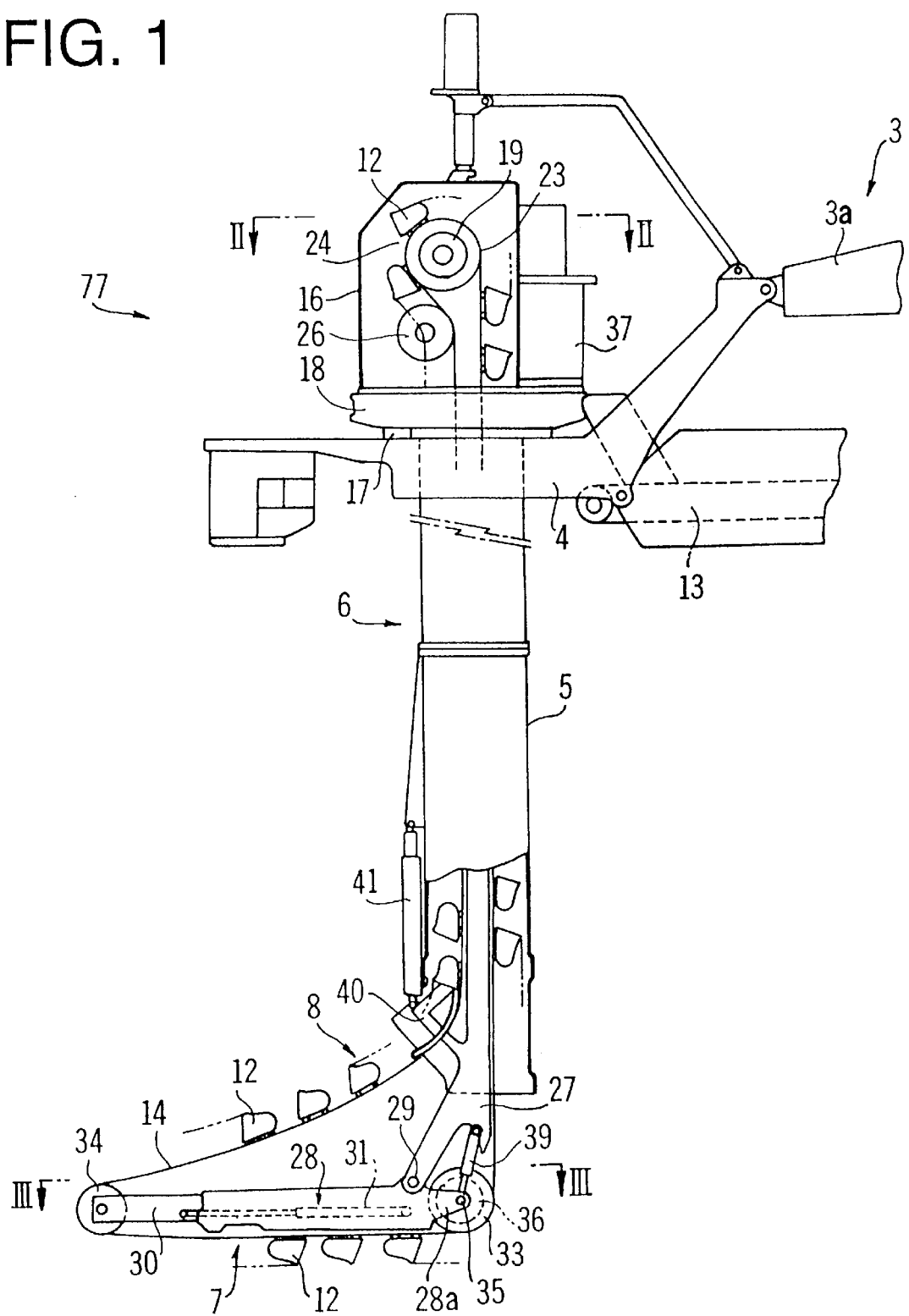
FIG. 1 is a partly sectional side view of a continuous unloader showing a preferred embodiment of the first aspect of the present invention.
Figure 2:
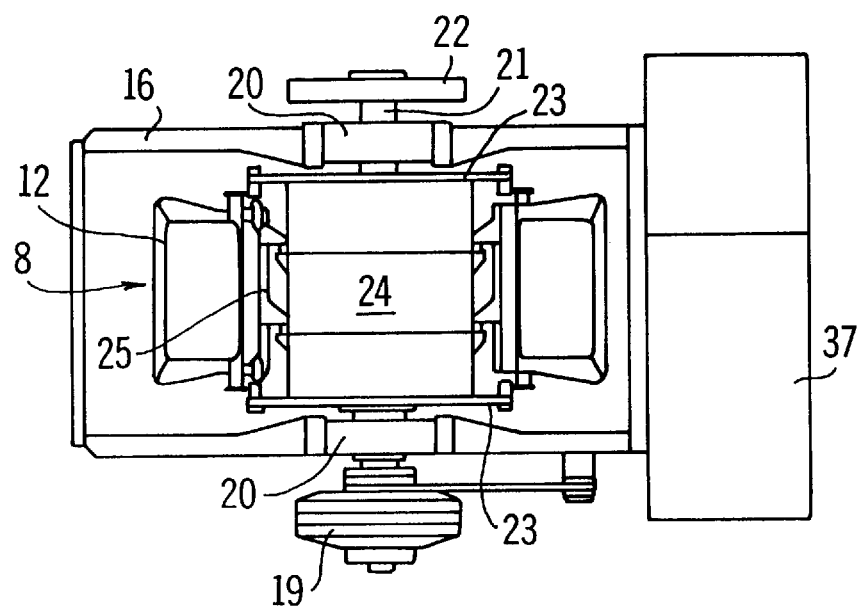
FIG. 2 is a sectional view taken along the line II—II of FIG. 1.
Figure 3:
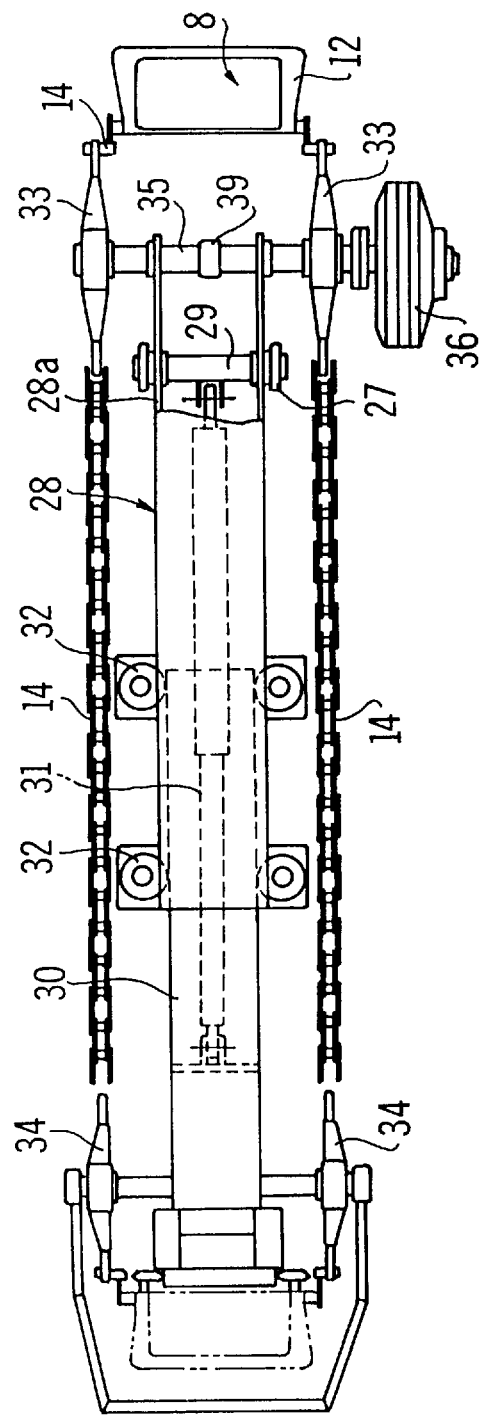
FIG. 3 is a sectional view taken along the line III—III of FIG. 1.
Figure 22:
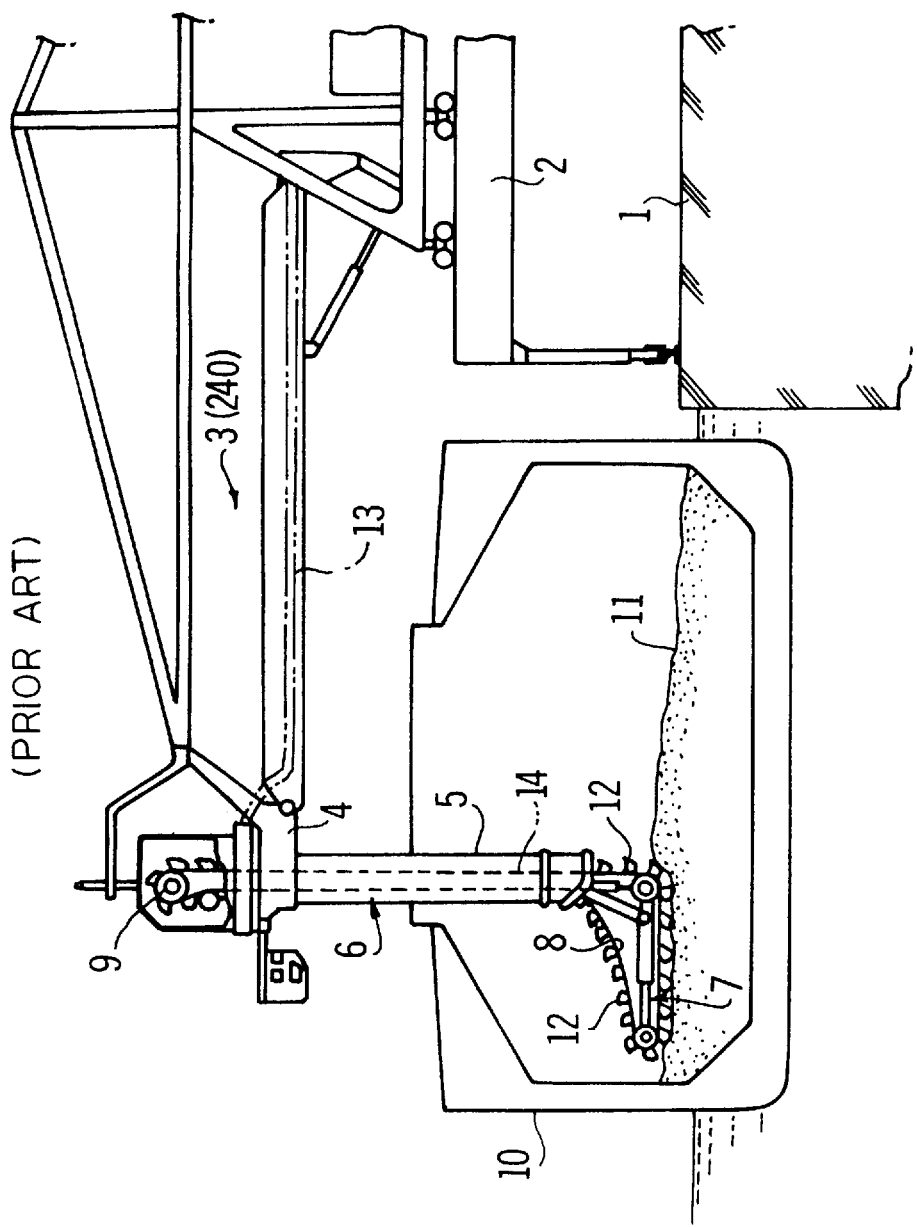
FIG. 22 shows a continuous unloader of the prior art.

FIG. 1–FIG. 3 illustrate a continuous unloader according to the present embodiment. In this embodiment, like reference numerals of FIG. 22 are designated to like structural elements in FIG. 1–3.

In FIG. 1, a boom 3 includes a boom conveyer 13. The boom conveyer 13 is supported on a traveling component 2 which can freely travel along a dock 1 in a way that free slewing and derrick motions of the boom 3 are allowed. An elevator portion 6 is provided in a way that it plums down from a frame 4 installed at an end of the boom 3. A digging portion 7 horizontally extends from the bottom of the elevator portion 6. A bucket conveyer 8 which includes drive chains 14 and a number of buckets 12 connected to the chains 14 is provided in a way that it circulates through the digging 7 and the elevator 6 portions.

The elevator portion 6 with an elevator casing 5 which freely rotates about its vertical axis is supported by a top support frame 4 and plums down from it, wherein a top support frame 4 is coupled with the end of a boom conveyer 13 and a balancing lever 3a. An upper casing 16 for covering the upper part of the bucket conveyer 8 is connected to the upper part of the elevator casing 5. A table feeder 18 for receiving bulk cargoes from the overturned buckets 12 is provided between the upper casing 16 and the elevator casing 5 by way of a slewing ring 17 in a way that the table feeder 18 can freely slew about the axis of the elevator casing 5. The bulk cargoes in the table feeder 18 are transferred to the dock by a boom conveyer 13 which is connected with the top support frame 4.

A first drive component 19 for driving the bucket conveyer 8 is provided inside the upper casing 16. As shown in FIG. 2, the first drive component 19 is provided on a rotary shaft 21 which is rotatably supported by way of a pair of bearings 20 inside the upper casing 16. More precisely, a hydraulic motor as the first drive component 19 is provided at one end of the rotary shaft 21, while a brake device 22 at the other end of the shaft.

On the rotary shaft 21, a rotary drum 24 is provided which at its both ends has an upper sprocket 23 for taking up the drive chains 14 of the bucket conveyer 8, wherein the upper drive sprocket 23 corresponds to the first sprocket described in claim 2. Guides 25 for guiding the buckets 12 of the bucket conveyer 8 are provided on the rotary drum 24. Additionally, as shown in FIG. 1, a reverse drum 26 for reversing the buckets 12 of the bucket conveyer 8 is provided on the downstream side of the rotary drum 24.

As shown in FIG. 1, a support frame 27 is supported inside the lower part of the elevator casing 5 in a way that the frame 27 can make free up and down motion by way of an elevator cylinder 41. As shown in FIG. 3, at the bottom end of the support frame 27, one side 28a (the elevator portion's side) of the extensible frame 28 of the digging portion 7 which can make horizontally telescopic motion is supported by way of a tilting shaft 29 in a way that the frame 28 can make free tilting motion. An extensible cylinder 31 used for the telescopic motion of the extensible portion 30 is provided in side the extensible frame 28, while guiding rollers 32 for guiding the telescopic motion of the extensible portion 30 are provided outside the extensible frame 28.

A pair of lower drive sprockets 33 for taking up the drive chains 14 of the bucket conveyer 8 is rotatably provided at the base end 28a of the extensible frame 28, wherein the lower drive sprocket 33 corresponds to the second sprocket described in claim 2 and the base end 28a of the extensible frame 28 corresponds to the corner portion which connects the elevator portion 6 and the digging portion 7 described in claim 2. On the other hand, a pair of slave sprockets 34 is rotatably provided at the distal end of the extensible portion 30 of the extensible frame 28. As shown in FIG. 3, a second drive component 36 for rotationally driving a rotary shaft 35 of the lower drive sprockets 33 is provided at one end of the rotary shaft 35.

A hydraulic motor is employed for the second drive component 36 as it is employed for the first drive component 19, and the second 36 and the first 19 drive components are synchronously driven for rotation by a hydraulic unit 37 provided in the upper casing 16. That is, oil pressure generated in the hydraulic unit 37 is distributed through branch pipes (not shown) to each hydraulic motor of the first drive component 19 and the second drive component 36 so that each motor be controllable operated under an equal pressure.

As shown in FIG. 1, a telescopically extensible tilting cylinder 39 for making the horizontally extended extensible frame 28 tilt is provided between the rotary shaft 35 and the support frame 27. And the telescopically extensible elevator cylindric 41 for elevating the support frame 27 as described above is provided between the lower periphery of the elevator casing 5 and a lower arm 40 of the support frame 27. The elevator cylinder 41, the extensible cylinder 31 and the tilting cylinder 39 are associatedly extended/retracted so that the extension/retraction they make can absorb the slack of the drive chains 14 caused by the tilting, elevation and extension/retraction of the digging portion 7.

Next, the function of the present embodiment is described.

When bulk cargoes 11 in a ship are unloaded, at first the elevator portions 6 and the digging portion 7 are brought into the ship and then the bucket conveyer 8 is circularly driven by synchronously driving the first 19 and the second 36 drive components. After this, the digging portion 7 is settled on the load (the bulk cargoes 11).

The bulk cargoes 11 in the ship are dug with the buckets 12 of the digging portion 7 of the bucket conveyer 8, lifted up by the elevator portion 6, transferred onto the table feeder 18 when the buckets 12 are reversed by a reversion drum provided on the downstream side of the upper drive sprockets 23, spilled onto the boom converter 13 and eventually unloaded to the dock.

Figure 4C:
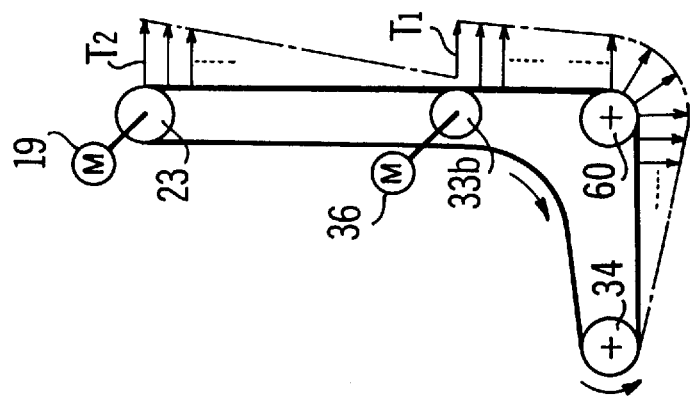
FIG. 4($a$) shows tensions on a drive chain expected in the prior art.
Figure 4B:
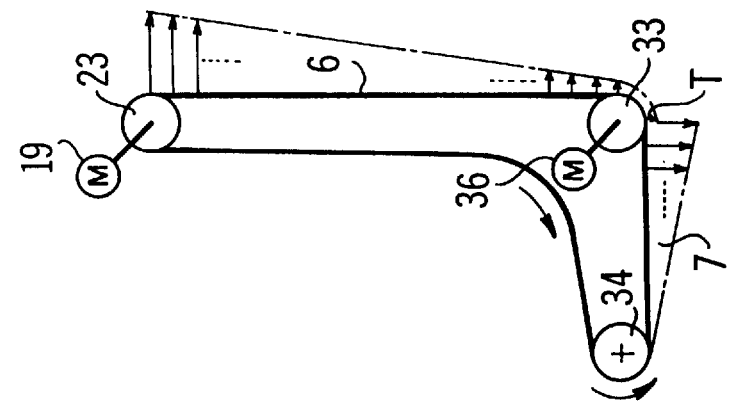
Figure 4A:
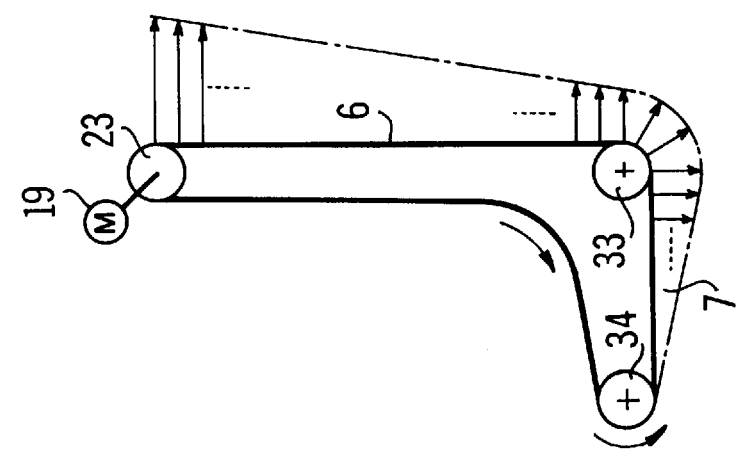

Herein since the first 19 and the second 36 drive components are synchronously driven by the hydraulic unit 37, tension on the drive chain 14 of the bucket conveyer 8 is shared between the first 19 and the second 36 drive components, decreasing the tension to which each drive component is subjected FIGS. 4(a), (b), and (c) show tensions working on the drive chain 14. FIG. 4(a) shows tension working on the drive chain when a type of the prior art is employed in which only the upper sprockets 23 are driven by the drive component 19 while the other sprockets 33, 43 are slaved by the upper ones 23. FIG. 4(b) shows tension working on the drive chain 14 when a type of the present embodiment is employed in which the upper sprocket 23 and the lower (corner portion) sprocket 33 are driven by the first drive component and the second drive component respectively, while only the sprockets 34 are slaved.

In the unloader of the prior art shown in FIG. 4(a), all the added (accumulated) digging resistance in the digging portion 7 and the lifting resistance in the elevator portion 6 is to be dealt with solely by the drive component 19 of the upper sprocket 23. Therefore, a part of the drive chain 14 right under the upper sprocket 23 is subjected to very large tension which is the sum of a tension on the drive 14 resulting from the digging resistance in the digging portion 7 and a tension on the drive chain 14 resulting from the lifting resistance of the load in the elevator portion 6.

On the other hand, in the unloader of the present embodiment shown in FIG. 4(b), the tension on the drive chain 14 resulting from the digging in the digging portion 7 works on the second drive component 36 which drives the lower (corner portion) sprocket 33. The tension on the drive chain 14 resulting from the lifting resistance of the load in the elevator portion 6 works on the first drive component 19 which drives the upper sprocket 23. Thus, the tension on the drive chain 14 is shared between the first and the second drive components 19, 36 and the tension to which each drive component is subjected is decreased. Herein it is preferable that some of the tension (=T) in the digging portion 7 is remained on the elevator's 6 side so that the chain 14 can avoid being slacked. The remained tension T may be a very small force.

According to the first embodiment of the present invention, the size of the drive chain 14 does not need to be increased even though the transfer capacity of the bucket conveyer 8 becomes larger since the tension on the drive chain 14 is shared by two drive components. This allows the size of the drive chain 14 to be kept relatively small, which not only reduces the weight of the whole system achieving lower production cost, but also enables the high-speed operation of the bucket conveyer with less noise from the drive chain 14.

Figure 5:
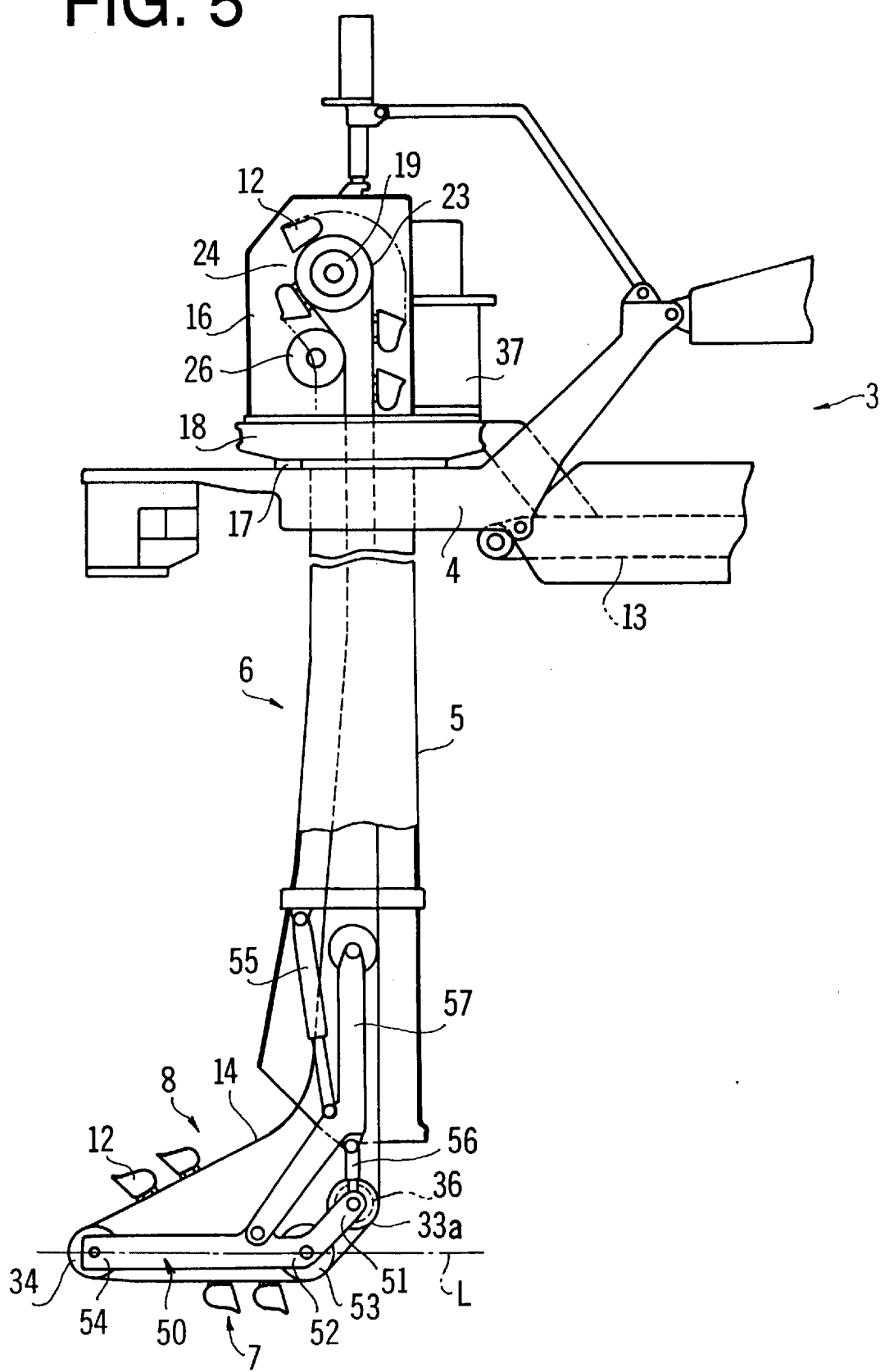
FIG. 5 shows the first modified embodiment.

Next, a first modified embodiment of the first aspect of the present invention is shown in FIG. 5.

According to the first modified embodiment, as shown in the drawing, one end 51 of a digging frame 50 which is a part of a digging portion 7 is upwardly bent and a second drive component 36 is provided at the end 51. More precisely, the digging frame 50 includes: a lower drive sprocket 33a provided at the end 51 of the frame 50 driven by the second drive component 36; a slave sprocket 53 provided at the bent portion 52; and another slave sprocket 34 provided at the other end 54 of the frame 50, wherein the lower drive sprocket 33a corresponds to the second sprocket described in claim 3. The lower drive sprocket 33a is located above the horizontal axis of the digging portion 7.

The second drive component 36 includes a hydraulic motor provided on a rotary shift of the lower drive sprocket 33a, and this motor and a hydraulic motor of a first drive component 19 which is provided at the upper position of the elevator 6 are synchronously driven. The first drive component 19 is so provided as it is in the preferred embodiment. More precisely, oil pressure generated in a hydraulic unit 37 is distributed through branch pipes (not shown) to the hydraulic motors of the first and the second drive components 19, 36 respectively, so that each motor be controllable operated under an equal pressure.

In addition, the digging frame 50 is adapted to make swing motion by way of a swing frame 57 when cylinders 55, 56 telescopically extend/retract. Since other portions/components are similar to those of the preferred embodiment and like reference numerals are designated to like structural elements, more details on them will be omitted.

In the arrangement above, as observed in the preferred embodiment, the tension working on the drive chain 14 is eventually decreased (ref. FIG. 4(b)) since tension on a drive chain 14 of a bucket conveyer 8 is shared between two drive components 19, 36 by synchronously driving these two drive components 19, 36. Thus, the size of the drive chain 14 can be kept relatively small.

Further, since the lower drive sprocket 33a is located above the horizontal axis of the digging portion 7, the drive chain 14 can steadily be taken up to the lower drive sprocket 33a with a predetermined bending, angle at the sprocket 33a. Thus, drive slip which results from the insufficient taking-up angle of the chain 14 against the sprocket 33a can be prevented.

Figure 6:
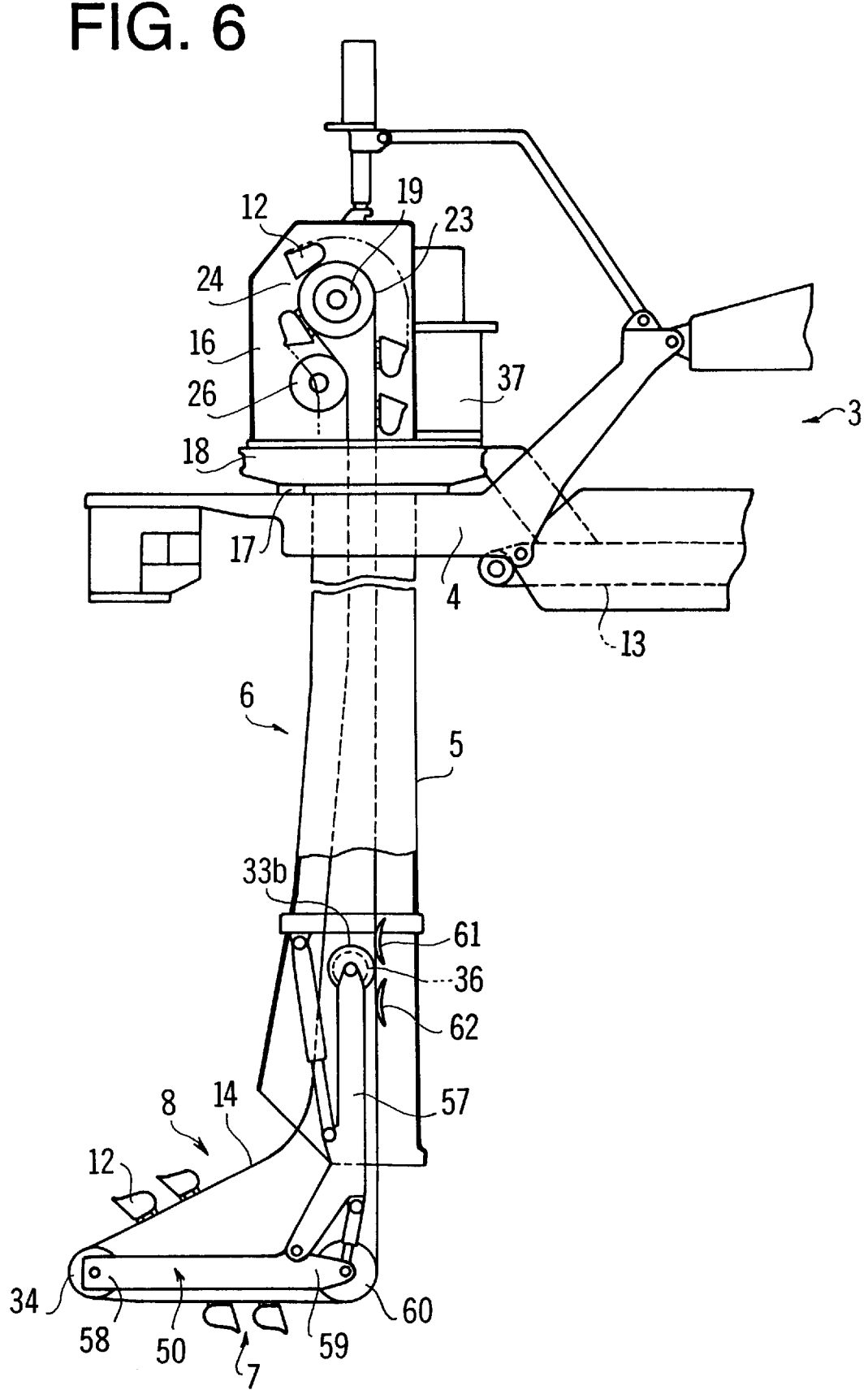
FIG. 6 shows the second modified embodiment.

Next, a second modified embodiment is shown in FIG. 6.

According to the second modified embodiment, as shown in the drawing, a digging frame 50 is remained linear without being bent (in the first modified embodiment a digging frame is bent). A second drive component 36 is provided at the top end of a swing frame 57 which swings the digging frame 50, and slave sprockets 34, 60 are provided at each end 58, 59 of the digging frame 50. More precisely, each drive sprocket 33b engaged with the drive chain 14 is located at the top end of the swing frame 57 and a hydraulic motor which is a part of the second drive component 36 is provided on a rotary shaft of the drive sprockets 33b, wherein the drive sprocket 33b corresponds to the second sprocket described in claim 4.

The upper drive sprocket 33b is arranged above the end 59 (corner portion) which connects the elevator portion 6 with the digging portion 7. More precisely, as shown in FIG. 4(c), the drove sprocket 33b is mounted at the position where the maximum tension T1 working on the chain 14 between the sprocket 34 and the sprocket 33b is substantially equal to the maximum tension T2 working on the chain 14 between the sprocket 33b and the sprocket 23.

Figure 7:
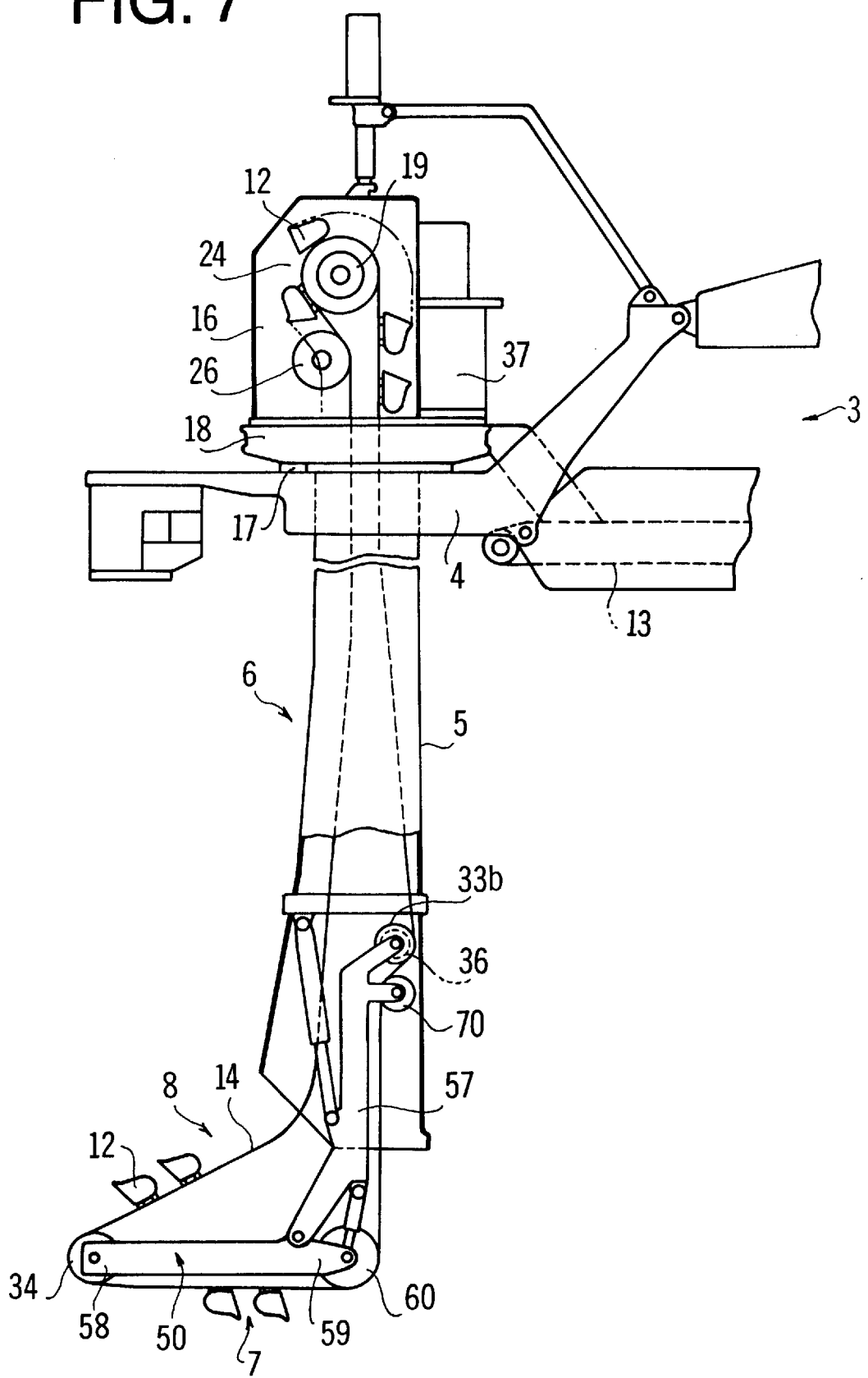
FIG. 7 shows the third modified embodiment.

If the chain 14 is taken up on the drive sprocket 33b with a relatively small taken-up angle against the sprocket 33b, chain guides 61, 62 (shown in FIG. 6) or idle sprockets 70 (shown in FIG. 7) must be provided on the opposite side of the sprocket 33 at two vertical positions in a way that the chain 14 is sandwiched between the sprocket 33 and them, so that the chain 14 be held on the sprocket 33b (FIG. 6) or the taken-up angle of the chain 14 against the sprockets 33b be increased (FIG. 7). This prevents the chain 14 from running off the sprocket 33. The chain guides 61, 62 may be biased toward the chain's 14 side with springs and the like. Since other portions/components are similar to those of the first modified component and like reference numerals are designated to like structural elements, more details on them will be omitted.

In the arrangement above, as observed in the previous embodiment, the tension working on the drive chain 14 is eventually decreased since tension on the drive chain 14 of a bucket conveyer 8 is shared between two drive components 19, 36 by synchronously driving these two drive components 19. 36. If the drive sprocket 33b is provided, as shown in FIG. 4(c), at a specific position where the maximum tension T1 working on the chain 14 between the sprocket 34 and the sprocket 33b is substantially equal to the maximum tension T2 working on the chain 14 between the sprocket 33b and the sprocket 23, the tension to which the drive chain 14 is subjected can be decreased to the half of the tension to which the drive chain of the prior art (shown in FIG. 4(a)) with only one drive component of the chain 14 would be subjected. Thus, the size of the drive chain 14 may be kept relatively small due to the small tension forces achieved as above.

Further, the positions of the two drive components 19, 36 are not limited to those suggested in these modified embodiments, but may be any two positions situated along the direction of circulation of the drive chain 14 of the bucket conveyer 8 because any two positions would make no difference in terms of sharing the tension on the drive chain 14 between them.

Further, the number of the drive components is not limited to two, but in the case of a larger continuous unloader, it is rather preferable to provide more than two drive components in order to make the large tension on the drive chain be shared by multiple drive components.

As described above, when the transfer capacity of the bucket conveyer is increased with causing a higher tension on the chain, the arrangement according to the first aspect of the present invention decreases the tension working on the drive chain and thus allows the drive chain to avoid becoming larger (and heavier), which contributes to the weight reduction of the whole system. Since the drive chain remains relatively small, the bucket conveyer may be operated at a higher speed and the drive chain makes less noise.

A preferred embodiment of the second aspect of the present invention will be described in accordance with the accompanying drawings.

Figure 8:
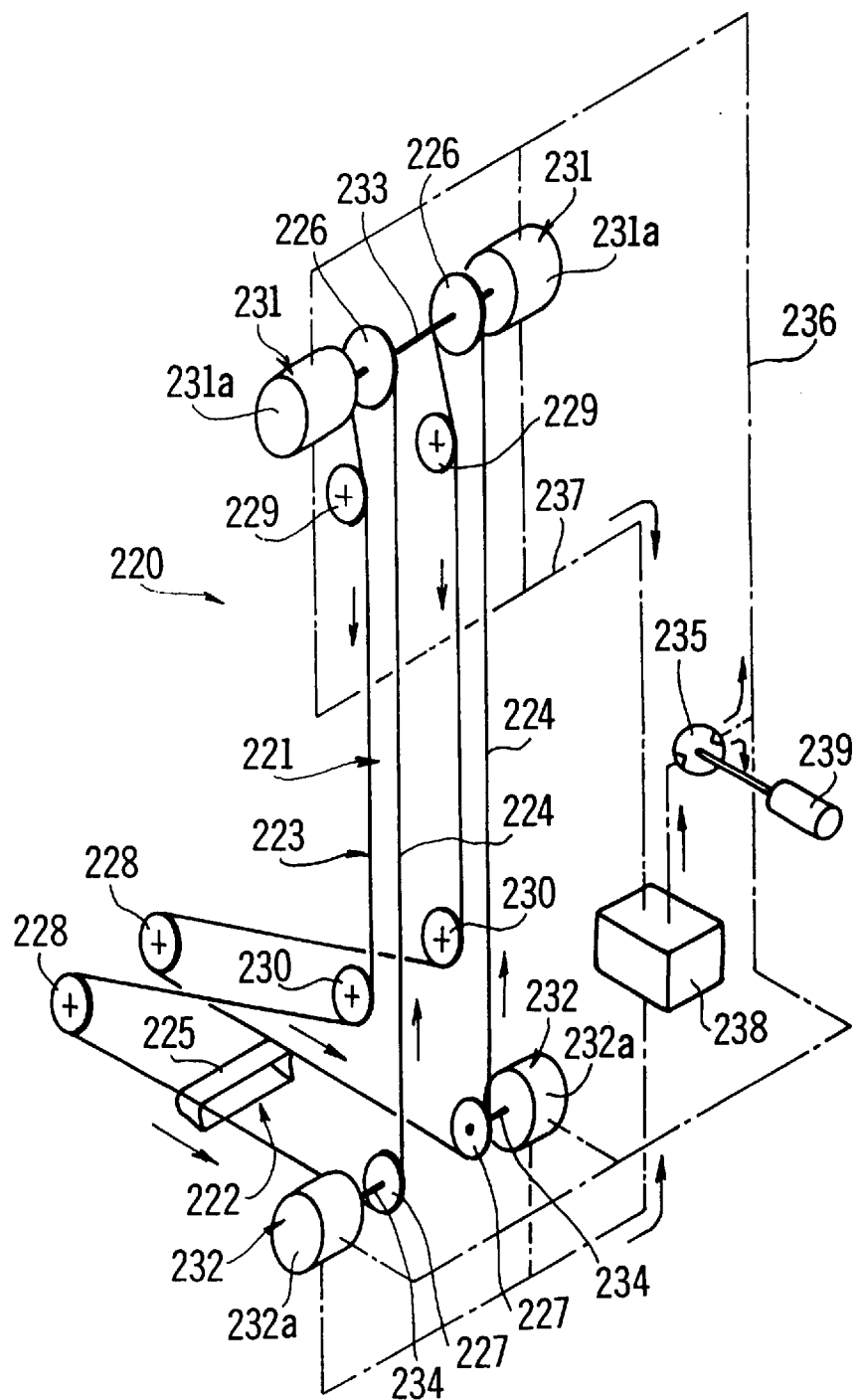
FIG. 8 is a schematic perspective view of a continuous unloader of a preferred embodiment of the second aspect of the present invention.

FIG. 8 shows a schematic view of a continuous unloader 220 of the present invention. As shown in the drawing, the continuous unloader 220 has an arrangement in which left and right (endless) chains 224, 224 of a chain bucket conveyer 223 are taken up so that they can circulate through an elevator portion 221 which is vertically arranged and a digging portion 222 which is horizontally extending from the bottom end of the elevator portion 221. The chain bucket conveyer 223 has an arrangement in which a plurality of buckets 225 is transversely connected between the left and the right chains 224, 224 with a predetermined distance between each other in the direction of circulation.

The elevator portion 221 is a part of the chain bucket conveyer 223 located between an upper sprocket 226 and a foot sprocket 227 of the digging portion 222, and lifts up bulk cargoes such as coal and iron ore after they are dug with the digging portion 222. The digging portion 222 is a part of the chain bucket conveyer 223 between the end sprocket 228 and the foot sprocket 227 of the digging portion 222, and digs the cargoes in a ship with the buckets 225. Further, reversion wheels 229 for turning over the buckets 225 and guide rollers 230 for biasing the chain 224 are also provided in the elevator portion 221.

The upper sprocket 226 and the foot sprocket 227 of the digging portion 222 are driven by a first drive component 231 and a second drive component 232, respectively. More precisely, the upper sprocket 226 has its left and right sprockets 226 which are linked with a common shaft 233. The shaft 233 is synchronously driven by hydraulic motors 231 that are provided as the first drive component 231 on both left and right hand sides of the shaft 233. On the other hand, the foot sprocket 227 of the digging portion 222 has its left and right sprockets 227 each of which has its own shaft and is independently driven by its hydraulic motor 232a. The hydraulic motors 232a are the second drive component 232 provided on each shaft 234, 234.

These hydraulic motors 231a, 232a are linked by way of a hydraulic pump 235 and branch pipes 236 and controllably operated under an equal pressure. That is, each of the hydraulic motors 231a, 232a synchronously rotates achieving an equal load on each of them since oil pressure generated in the oil pump 235 is evenly distributed through the branch pipes 236 to each of the hydraulic motors 231a, 232a. The oil discharged from each of the hydraulic motors 231a, 232a is retrieved into an oil reservoir 238 through retrieval pipes 237 and then pumped up again with the hydraulic pump 235. The oil pressure is driven by an electric motor 239.

Figure 9:
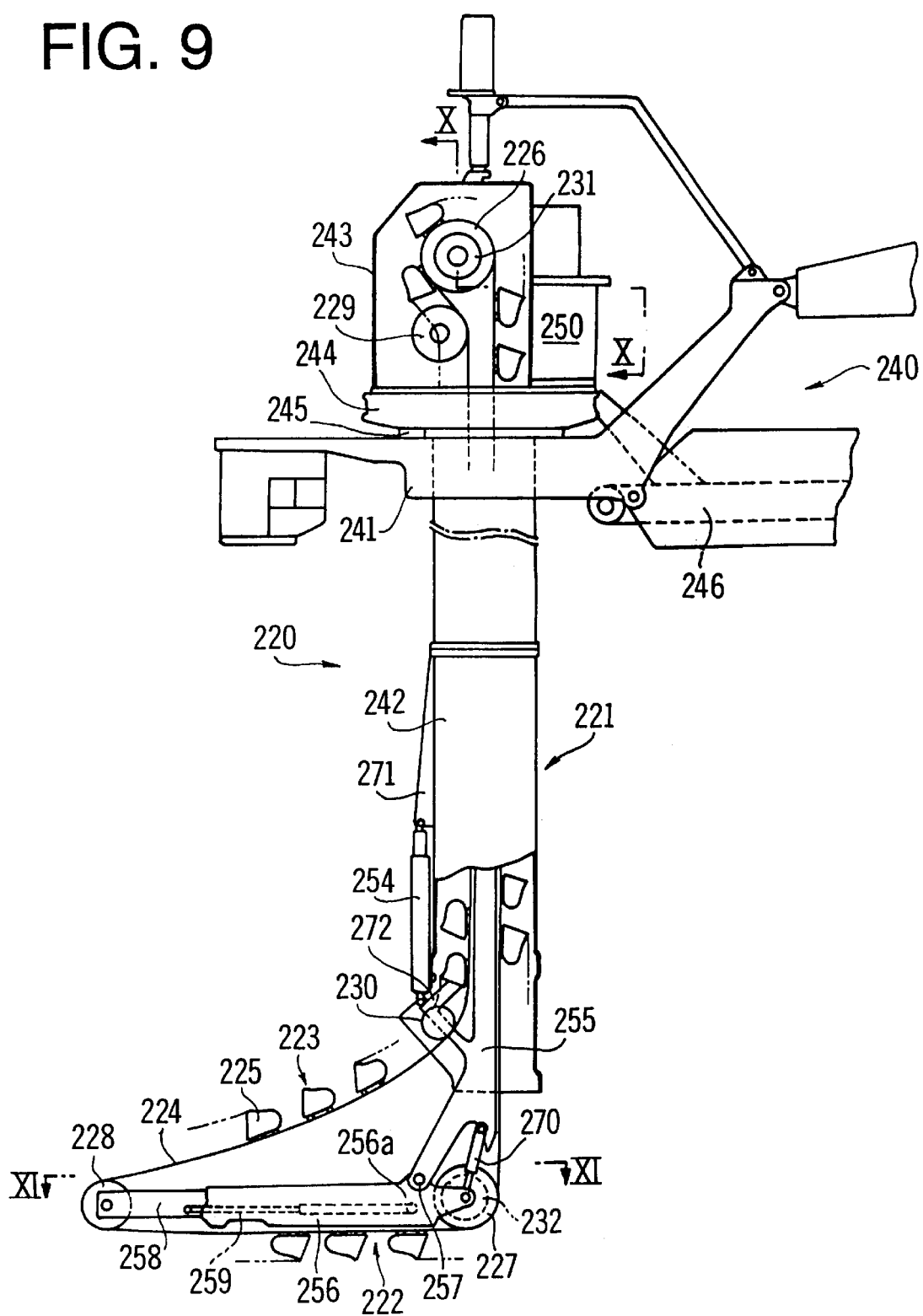
FIG. 9 is a partly sectional side view of the continuous unloader shown in FIG. 8.

The details of the continuous unloader 220 will be described with FIGS. 9–12. In FIG. 9, a boom 240 is supported on a traveling component 2 which can freely travel along a dock 1, in a way that free slewing and derrick motions of the boom 240) are allowed (ref. FIG. 22). An elevator portion 221 is provided in a way that it plums down from all end of the boom 240. A digging portion 222 horizontally extends from the bottom of the elevator portion 221. A bucket conveyer 223 which includes the drive chains 224, 224 and a number of buckets 225 connected to the chains 224, 224 is provided in a way that it circulated through the digging and the elevator portions 222, 221.

The elevator portion 221 with an elevator casing 242 which freely rotates about its vertical axis is supported I), a top support frame 241 and plums down from it, wherein a top support frame 241 is coupled with the end of the boom 240. An upper casing 243 for covering the upper part of the bucket conveyer 223 is connected to the upper part of the elevator casing 242. A table feeder 244 for receiving bulk cargoes from the overturned buckets 225 is provided between the upper casing 243 and the elevator casing 242 by way of a slewing ring 245 in a way that the table feeder 244 call freely slew about the axis of the elevator casing 242. The bulk cargoes in the table feeder 244 are transferred to the dock by a conveyer 246 which is connected with the top support frame 241.

Figure 10:
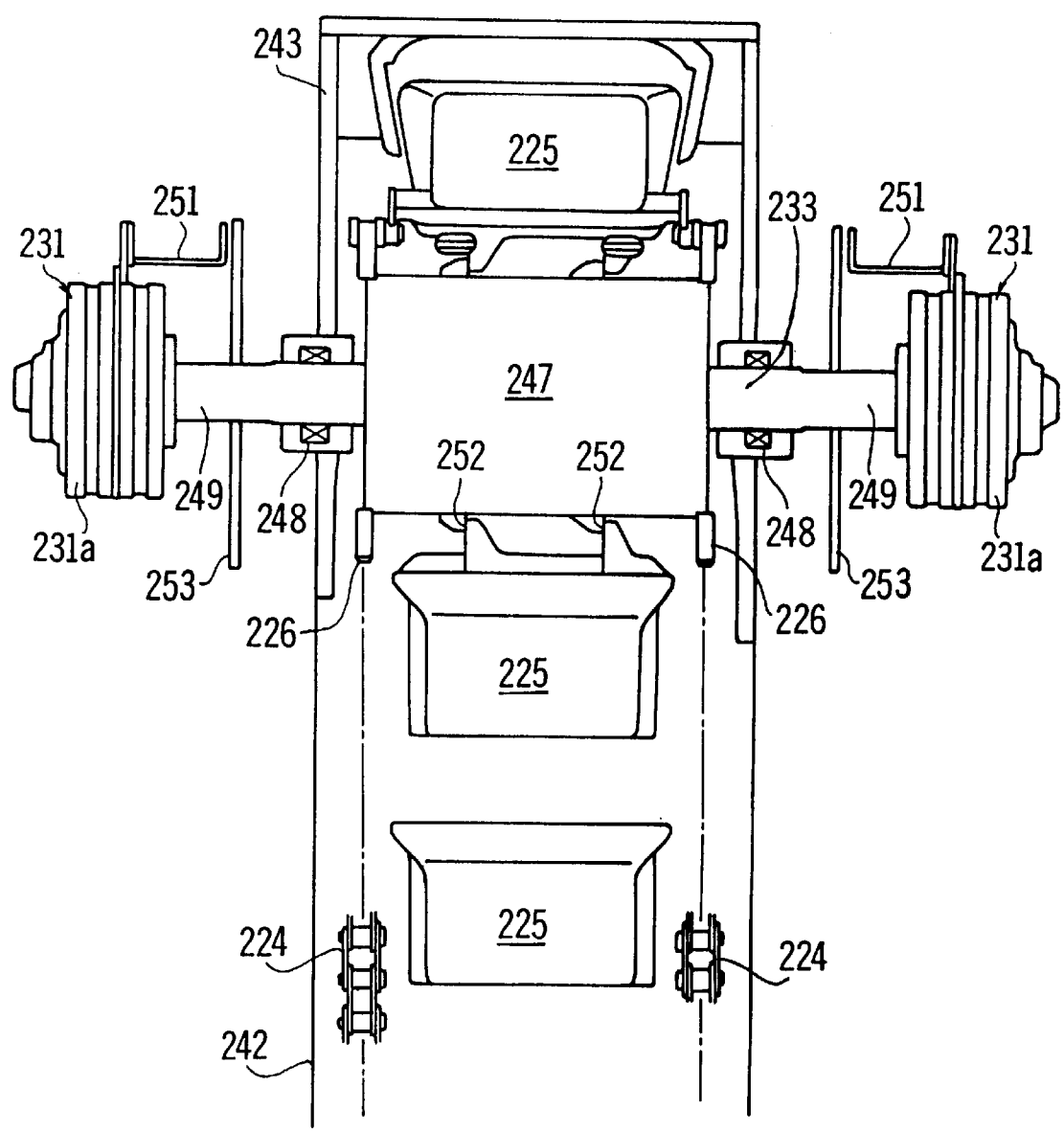
FIG. 10 is a sectional view taken along the line X—X of FIG. 9.

In the upper casing 243, as shown in FIG. 10, a rotary drum 247 which corresponds to the common shaft 233 in FIG. 8 is rotatably provided by way of pair of bearings 248. The upper sprockets 226, 220 on which the left and right chains 224, 224 of the chain bucket conveyer 223 are taken up respectively are provided on the left and right hand side of the rotary drum 247. Further, the drive component 231 for rotating the rotary drum 247 is provided on each end of a rotary shaft 249 of the drum 247. These paired first drive components 231 include the hydraulic motors 231a, 231a to which the hydraulic pump 235 shown in FIG. 8 supplies oil pressure through the branch pipes 236 for synchronous operation of the motors 231a, 231a.

The hydraulic pump 235 is provided in a hydraulic unit 250 provided on a side of the upper casing 243 shown in FIG. 9. One end of each torque arm 251, 251 is provided on each of the hydraulic motors 231a. The other end of each torque arm 251 is fixed on the upper casing 243 and holds back the rotatory reaction force of the hydraulic motor 231a. Further, guides 252 for guiding the buckets 225 of the chain bucket conveyer 223 are provided beside the rotary drum 247, while disc brakes 253 using pads (not shown) for clamping the shaft 249 are provided around the rotary shaft 249.

Figure 11:
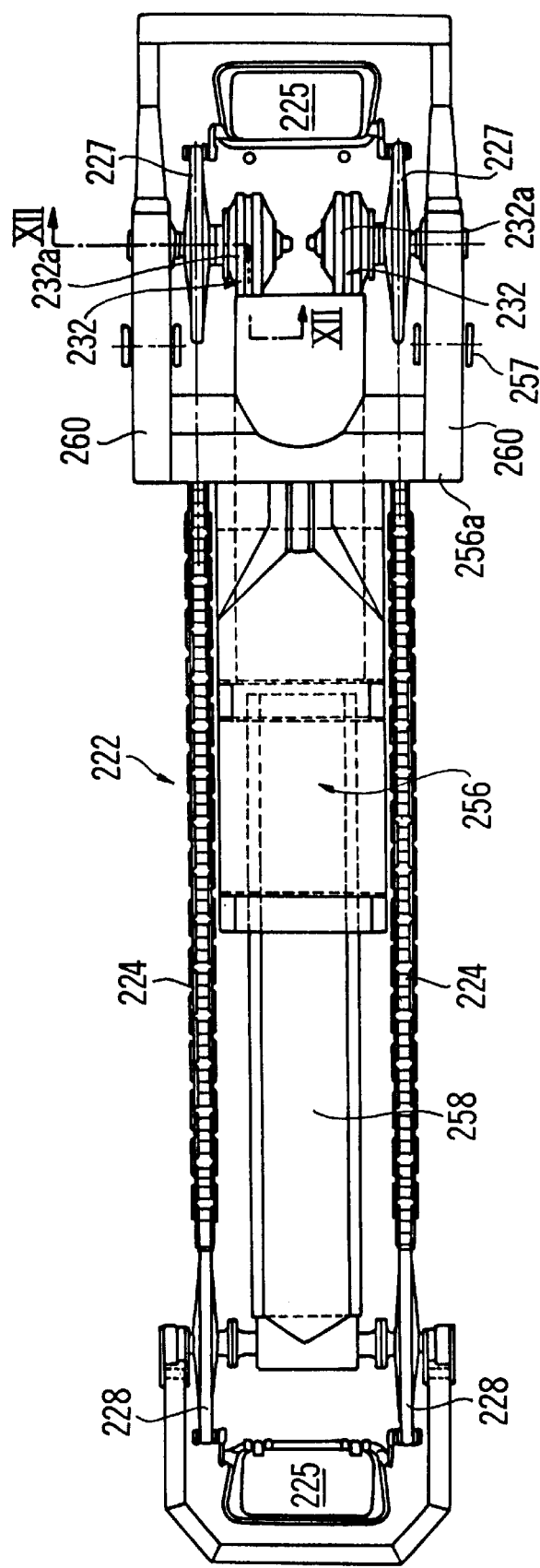
FIG. 11 is a sectional view taken along the line XI—XI of FIG. 9.

As shown in FIG. 9, an elevation frame 255 is supported inside the lower part of the elevator casing 242 in a way that the frame 255 can make free up and down motion by away of all elevator cylinder 254. As shown in FIG. 11, at the bottom end of the elevation frame 255, one side 256a of the extensible frame 256 of the digging portion 222 which can make horizontally telescopic motion is supported by way of a tilting shift 257 in a way that the frame 256 can make free tilting motion. An extensible cylinder 259 used for the telescopic motion of the extensible portion 258 is provided in side the extensible frame 256, while guide rollers (not shown) for guiding the telescopic motion of the extensible portion 258 is provided outside the extensible frame 256.

As shown in FIG. 11, a fork-shaped frame 260 is provided at the base end 256a of the extensible frame 256. A foot sprocket 227 of the digging portion 222 is rotatably provided on each of left and right inner sides of the fork-shaped frame 260, respectively. Each of these foot sprockets 227, 227 is independently driven by the associated second drive component 232. Each second drive component 232, 232 is provided )on the inner side of its associated foot sprocket 227, 227 so that each can be protected from the bulk cargoes such as iron ore, aid includes a hydraulic motor 232a just as the first drive component 231 does (ref. FIG. 8).

More precisely, oil pressure generated in the hydraulic motor 235 inside the hydraulic unit 250 shown in FIG. 9 is distributed through the bra(inch pipes 236 shown in FIG. 8 to the hydraulic motors 231a, 232a of the first 231 and the second 232 drive components, allowing the motors to be controllably operated under an equal pressure.

However, the hydraulic motor 232a of the second drive component 232 is allowed to have a smaller torque than the hydraulic motor 231a of the first drive component 231 does. This is because the first drive component 231 needs a large torque so that it can compete with a large load which results from lifting up the buckets 225 filled with the bulk cargoes vertically by the height of the elevator portion 221. On the other hand, the second drive component 232 needs only a small torque because it deals with only a small load which results from the digging resistance. The second drive component 232 is subjected to the digging resistance when it digs the bulk cargoes in a ship with the buckets 225.

More precisely, in the embodiment of the second aspect of the present invention wherein the first 231 and the second 232 drive components are provided at two positions along the circulating chains 224, the left and the right chains 224, 224 of the first drive component 231 which is subjected to a larger load are synchronously driven by a common shaft 233, while each of the left and the right chains 224, 224 of the second drive component 232 has its own shaft and is independently driven.

Figure 12:
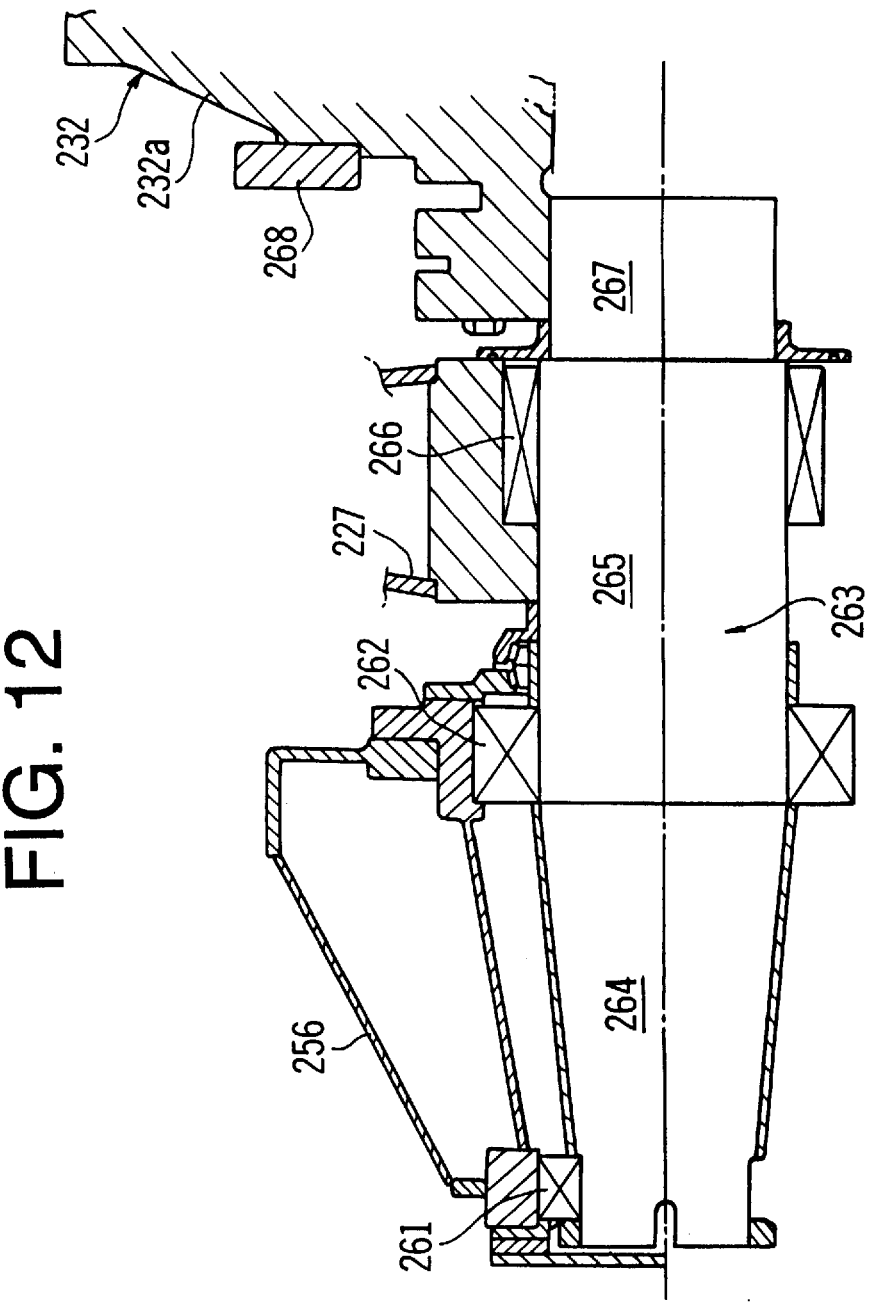
FIG. 12 is a sectional view taken along the line XII—XII of FIG. 11.

The details of the second drive component are shown in FIG. 12. As shown in the drawing, a tapered portion 264 of the rotary shaft 263 is supported by way of bearings 261, 262 at the base end 256a of the extensible frame 256. Foot sprockets 227 of the diggings portion 222 are mounted in the middle 265 of the rotary shaft 263 by way of keys or splines 266 or the like. The hydraulic motor 232a as the second drive component 232 is provide at the end 267 of the rotary shaft 263. One end of the torque arm 268 for supporting the rotatory rejection force is provided on the hydraulic motor 232a. The other end of the torque am 268 is fixed at an appropriate position on the extensible frame 256. As shown in FIG. 1 1, the left and the right chains 224, 224 of the chain bucket conveyer 223 are taken up on the left and the right foot sprockets 227 of the digging portion 222, respectively.

As shown in FIG. 9, a tilting cylindric 270 for making the extensible frame 256 tilt is provided between the elevator 255 and the extensible frame 250. Further, an elevation cylinder- 254 for elevating the elevation frame 255 is provided between the lower part 271 of the elevator casing 242 and an arm 272 of the elevation frame 255. The elevator cylinder 254, the extensible cylinder 259 and the tilting cylinder 270 are associatedly extended/retracted so that the extension/retraction they make can absorb the slack of the drive chain 224 caused by the tilting, elevation and extension/retraction of the digging portion 222.

Next, the function of the present embodiment is described.

When bulk cargoes in a ship are unloaded, at first the elevator portions 221 and the digging portion 222 are brought into the ship by the boom 240 and then the bucket conveyer 223 is circularly driven by synchronously driving the first 231 and the second 232 drive components. After this, the digging portion 222 is settled on the load (the bulk cargoes).

The bulk cargoes in the ship are dug with the buckets 225 of the digging portion 222 of the bucket conveyer 223, lifted up by the elevator portion 221, transferred onto the table feeder 244 when the buckets 225 are reversed by a reversion wheel 229 provided on the downstream side of the upper drive sprockets 226, spilled onto the conveyer 246 and eventually unloaded to the dock (ref. FIG. 22).

Herein since the hydraulic motors 231a, 232a of the first and the second drive components bucket conveyer 223 is shared between the first and the second drive components 231, 232, decreasing the tension which each drive component is subjected to.

Further, since the left and the right chains 224, 224 of the chain bucket conveyer 223 are synchronizes driven by the common shaft 233 of the first drive component 231 which is subjected to the largest load among a plurality of the drive components 231, 232, these chains can be synchronously circulated. That is, each phase of the left and the right chains 224 does not so significantly deviate from each other, preventing the buckets 225 of the elevator portion 221 from Even if the lengths of the left and the right chains 224, 224 are made different due to the slack of the chains and the like, the resulting; tilting of the bucket 225 will be very small. Herein the small tilting corresponds with the degree of the slack. By the way, if the second drive component 232 which is not subjected to the largest load had a common shaft while the first drive component 231 having a large drive force had two independent shafts, the common shaft of the second drive component 232 would be forcibly rotated by the more powerful first drive component 231 and could be exposed to a shearing force if rotational difference occurred between the left and the right first drive components. In order to resist the shearing force, the diameter of the common shaft of the second drive component would have to be increased, which would be undesirable.

In the present embodiment, however, the second drive component 232 has two independent shafts which independently drive the left and the right shafts, respectively. Thus, even if the lengths of the left and the right chains are made different because of the slack of the chains and the like, the tensions of the left and the right chains can be equalized because the hydraulic pump 235 controllable operates each of the hydraulic motors 232a, 232a of the second drive component 232 and allows it to make its independent rotation under an equal pressure and an equal load.

Therefore, if slacks should occur in the chains 224, the chains 224 can always be maintained tense between the sprocket 228 and the sprocket 227. They can also remain tense between the sprocket 227 and the sprocket 226. A portion of chains 224 which has become redundant because of the slacks is loosely held on the sprockets 226, 230, 228.

That is, in case that the lengths of the left and the right chains 224, 224 are made different because of slacks of the chains, the tensions of the left and the right chains 224, 224 will be equalized, preventing a situation in which only the shorter chain of the two is fully stretched and works while the other is idling.

As a result, the load which works on the chains 224, 224 is decreased, and this prolongs the life of the chains 224, 224, makes the chains 224 smaller and lighter, and thus reduces the weight and cost of the whole system.

Additionally, though the first and the second drive components 231, 232 are provided at the upper sprocket 226( aid the foot sprocket 227 of the digging portion 222, respectively, in the present embodiment, some modifications may be possible. For example, it will be acceptable that a sprocket driven by a third drive component (not shown) is provided between the sprocket 226 and the sprocket 227. It will be also acceptable that the chains 224, 224 are driven by only the third and first 231 drive components. However, in these variations the first drive component 231 still has to have a common shaft while the other drive components have two independent shafts, because the first drive component 231 is responsible for the largest load.

In sum, the continuous unloader according to the second aspect of the present invention allows the tensions to which the left and the right chains are subjected to be equalized even if the lengths of the left and the right chains of the chain bucket conveyer are made different. Thus, the load working on the chains is decreased, allowing smaller and lighter chains which contribute to size and weight-reduction of the whole system.

Next, a preferred embodiment of the third aspect of the present invention will be described in accordance with the accompanying drawings.

Figure 13:
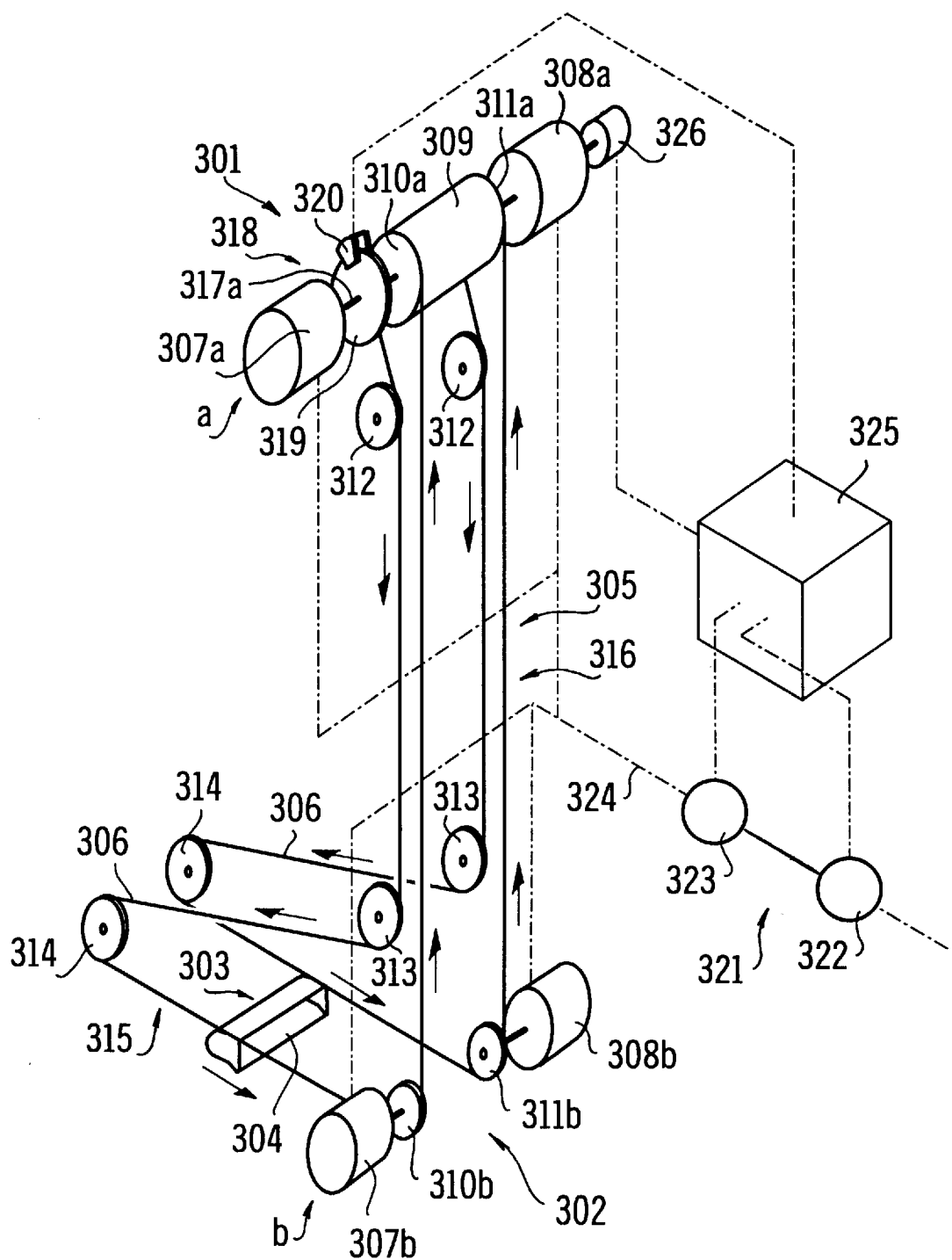
FIG. 13 is a schematic perspective view of a continuous unloader of a preferred embodiment of the third aspect of the present invention.

A continuous unloader according to the third aspect of the present invention is shown in FIG. 13. The continuous unloader 301 is connected to the free end of a boom (not shown) provided on a dock (not shown). The unloader 301 puts a digging portion 302 located it its lower part into a hold (of a ship, not shown), and digs the bulk cargoes such as iron ore and coals with buckets 304 of a bucket conveyer 303. The bulk cargoes dug into the buckets 304 are lifted up through an elevator portion 305 by the bucket conveyer 303 circularly moving in the direction indicated by the arrows in FIG. 13, and eventually transferred to the dock by way of a table feeder, a conveyer and the like.

The bucket conveyer 303 includes: a pair of endless chains 306 arranged with a distance between them; and a plurality of buckets 304 (only one of them is shown) which transversely links the paired chains with a predetermined distance between any two buckets. The digging portion 302 horizontally extends from the bottom end of the elevator portion 305. The elevator portion 305 has a vertically extended structure. The top position and the bottom position of the elevator portion 5 are respectively designated as an upper drive position and a lower drive position 1) at which the bucket conveyer 303 is driven. Two pairs of hydraulic motors (drive means) 307a, 308a, 307b, 308b for driving the bucket conveyer 303 are provided at the upper drive position a and the lower drive position b, respectively.

At the upper drive position a, the upper hydraulic motors 307a, 308a are provided in a way that they face each other. A drum member 309 is integrally and coaxially coupled with drive shafts of the upper hydraulic motors 307a, 308a, achieving a coaxial operation of the motors 307a, 308a at an equal velocity. Each upper sprocket 310a, 311a is integrally provided on each end of the drum member 309 and the top portion of each chain 306 is taken up on each of the sprockets 310a, 311a. The bucket conveyer 303 is driven by the upper hydraulic motors 307a, 308a.

At the lower drive position b, the lower hydraulic motors 307b, 308b are provided in a way that they face each other. A lower sprocket 310b, 311b is provided on each drive shaft of the hydraulic motor 307b, 308b. These lower sprockets 310b, 311b are situated vertically right under the upper sprockets 310a, 311a along the elevator portion.

Each lower sprocket 310b, 311b takes up each of the paired chains 306, 306, allowing the lower hydraulic motors 307, 308b to drive the bucket conveyer 303. It should be noted that each hydraulic motor 307b, 308b has its own shaft and is independently driven at the same speed. However, the lower and the upper hydraulic motors 307b, 308b, 307a, 308a are operated synchronously.

Each of the paired chains 306 of the bucket conveyer 303 is guidedly taken up not only by the sprocket 310a, 311a, 310b, 311b but also by a top idle sprocket 312 provided at the top end of the elevator portion 305, by an intermediate idle sprocket 313 provided on the boarder between the elevator portion 305 and the digging portion 302, and by a lower idle sprocket 314 provided at the top end of the digging portion 302. These idle sprockets 312, 313, 314 are slaved by the chains 306 and rotated according to the circulation of the chains 306.

The bottom 315 of the bucket conveyer 303 lying between the lower idle sprockets 314, 314 and the lower sprockets 310b, 311b forms a substantial part of the digging portion for digging the cargoes off, and horizontally extends with a right angle against the lifting-up section 316 of the elevator portion 305 of the bucket conveyer 303. The bucket conveyer 303 circulates through these sprockets in the direction indicated by the arrows.

The continuous unloader 301 further includes three jacks (not shown): an extensible jack for transferring the lower idle sprocket 314 toward/away from the lower sprockets 310b, 311b in a small distance; a jack for transferring the intermediate idle sprocket 313 so that it can absorb the slack of the chains 306 generated by the movement of the lower idle sprockets; and a tilting, jack for making the bottom 315 tilt against the lifting-up section 316. These jacks allow the digging, portion 302 or the bottom 315 to appropriately change its position, size and the like according to the actual situation of digging the cargoes.

In addition, a brake mechanism (a brake means) 318 is provided on a drive shaft 317 a of one of the upper hydraulic motors 307a at the upper drive position a. The brake mechanism 318 constrains or stops the bucket conveyer 303 when the unloader stopped its operation. The brake mechanism 318 of the present embodiment is a disc-brake mechanism which includes a disc 319 mounted on the drive shaft 317a and a caliper mechanism 320 fixed on a frame (not shown). The caliper mechanism 320 encloses brake pads which are mechanically operated and automatically clamp the disc 319 in the instant of the unloader's stopping. The operation above enables constraining the drum member 309 and thus restricting the movement of the bucket conveyer 303. Accordingly, when the unloader 301 is stopped, the bucket conveyer 303 freezes at that position without spilling the cargoes out.

The unloader 301 is provided with an oil pressure distributing portion 321 for distributing oil pressure to each of the hydraulic motors 307a, 308a, 307b, 308b. The oil pressure distribution portion 321 includes an electric motor 322 and a hydraulic pump 323 directly coupled with the electric motor 322. The hydraulic pump 323 is a swash plate type piston pump wherein swash plates are provided on it shaft of the electric motor 322 and the reciprocal movement of a piston caused by the rotation of these plates pressurizes it hydraulic oil for distribution. Further, the hydraulic pump 323 can adjust the amount of oil flow which is pressurized for distribution, by controlling the angle of the swash plates which is described hereinafter. The oil from the hydraulic pump 323 or the highly pressurized hydraulic oil is distributed through hydraulic circuit 324 (indicated by the one-dot line) to each of the hydraulic motors 307a, 307b, 308a, 308b for driving the bucket conveyer 303. The hydraulic oil which became low pressurized after driving the conveyer 303 is retrieved into I tank for reservoiring the hydraulic oil through hydraulic circuit for low pressurized oil (not shown).

Further, the unloader 301 is provided with a controller 325. The controller 325 contains a computer which not only controls velocity and position during, operation but also executes emergency stop of the unloader- 301 described hereinafter. The controller 325 is electrically connected to the electric motor 322, the hydraulic pump 323, the caliper mechanics 320 of the brake means 318 and a speed sensor 326 (the two-dot line in FIG. 13 represents the wiring). Herein, the speed sensor 326 is a rotary encoder for detecting the operational or rotational velocity of the upper hydraulic motor 308a to which the encoder is connected.

During the operation of the unloader 301, the controller 325 maintains a constant operational speed of the electric motor 322. On the other hand, the controller adjusts the amount of pressurized oil flow by controlling the angle of the swash plates so that each of the hydraulic motors 307a, 308a, 307b, 308b be operated at a predetermined speed. At the same time the controller 325 controls the posture of the unloader (precisely, the posture of the digging portion 302) by operating the jacks.

By the away, in the arrangement above, since the upper sprockets 310a, 311a are heavily burdened with the bucket conveyer 303 and the load on it, it is unlikely that the chains 306 will run off the sprockets. However, in the case of the lower sprockets 310b, 311b, if the idle sprockets 313, 314 should not work synchronously during the position control by the jacks described above, the chains 306 might run off the lower sprockets 310a, 311b. If this happens, the drive force will completely be out of function.

For example, if the chain 300 runs off one of the lower sprockets (e.g. 310b), the lower hydraulic motor 307b will be burdened with no load and begin rotating at an extremely high speed since most of the hydraulic oil flows into it. But the other hydraulic motors 307a, 308a, 308b will end up with substantial idling or stoppage because of no more oil pressure supply.

Then the hydraulic motor 307aL, 308a, 308b could be reversely driven due to the weight of the bucket conveyer 303 and the like, allowing the bucket conveyer to reversely circulate to eventually drop its load. Further, there may be a danger since the hydraulic motor 307b or the hydraulic pump 323 becomes very hot upon the hydraulic motor's 307b rotating at extremely high speeds. A similar situation will occur when the sprocket 210b is broken and lost its ability of transferring the drive force.

Thus, in the present invention, an arrangement is provided wherein the unloader 301 makes an emergency stop in case it detects an abnormal state of circular transfer of the bucket conveyer 303.

Figure 14:
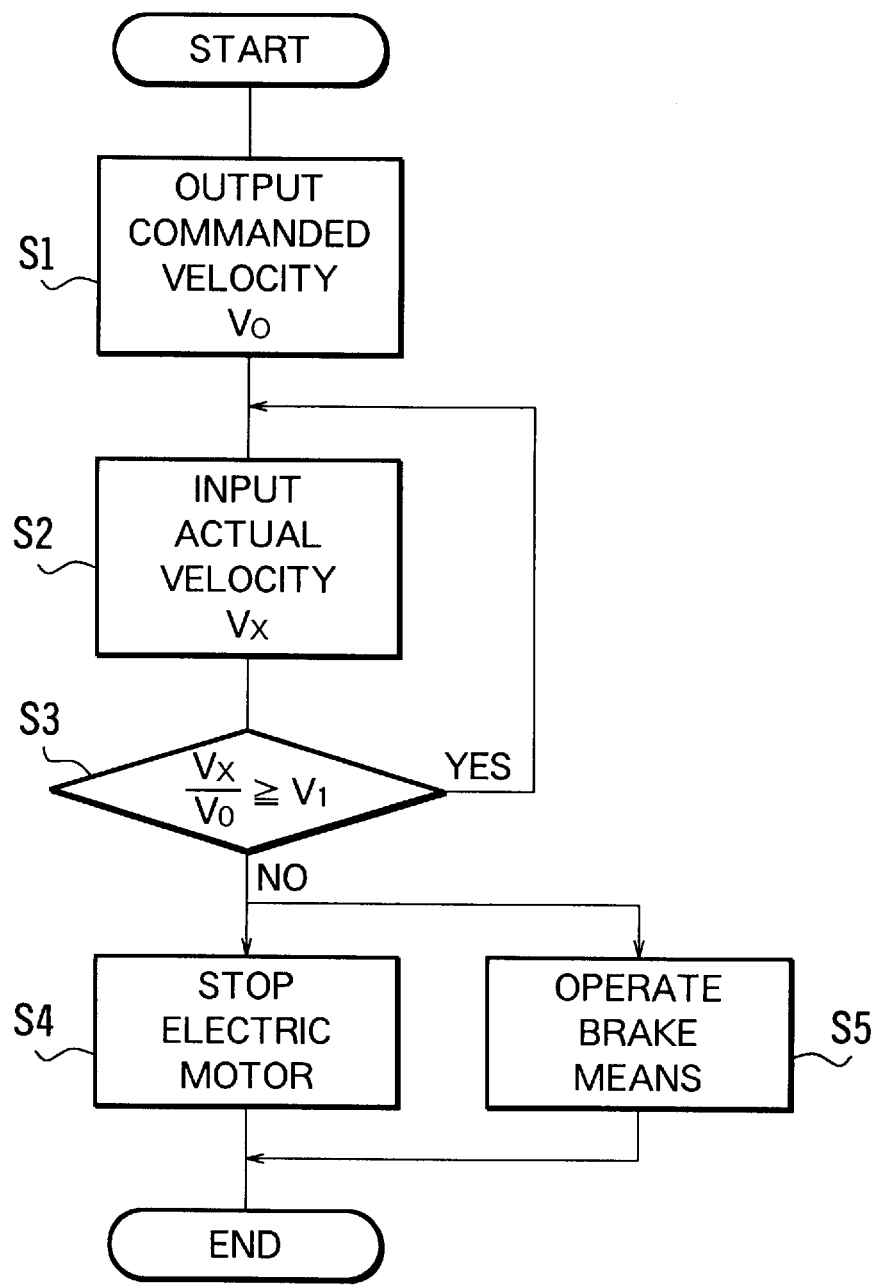
FIG. 14 is flow chart of the control which is performed by a controller shown in FIG. 13.

FIG. 14 shows a flow chart of the control performed by the controller 325. During the operation of the unloader 301, the controller 325 controls the amount of the pressurized oil flow from the hydraulic pump 323 at step S1 so that the upper hydraulic motor 308a (307a) be operated at a commanded velocity $V_0$. Then at step S2, the controller 325 inputs an output signal which comes from the speed sensor 326 for indicating the actual operational velocity $V_x$ of the upper hydraulic motor 308a.

At the next step S3, the ratio $V_x/V_0$ is compared with the comparison value $V_1$ (=0.9). If the ratio is equal to or exceeds $V_1$, the controller 325 judges that the bucket conveyer 303 is at a normal state of its circular transferring wherein the actual operational velocity $V_x$ is large enough. Then the controller goes back to S2.

On the other hand, if the ratio $V_x/V_0$ is smaller than $V_1$, the controller 325 judges that the bucket conveyer 303 is at an abnormal state of its circular transferring wherein the actual operational velocity $V_x$ is smaller than the normal value. This can occur when any of the lower hydraulic motor 307b, 308b experiences a rotation disorder such as rotation at an extremely high speed after the chain 306 ran off the lower sprocket and the like. The controller then proceeds to the next steps S4 and S5 wherein it stops the electric motor 322 at S4 and at the same time forcibly operates the brake mechanism 318 at S5.

When S4 and S5 are completed, oil pressure is not distributed to each hydraulic motor 307a–308b any more because the hydraulic pump 323 is also stopped, and this virtually stops each hydraulic motor 307a–308b.

The movement of the bucket conveyer 303 is then subject to simultaneous and complete constriction by the brake mechanism 318, which prevents the bucket conveyer 303 from being reversely circulated by its own weight and its load. Thus dropping of the load from the buckets is prevented, significantly and reliably improving safety.

In the present invention, since the speed sensor 320 is connected with the upper hydraulic motor 308a of the upper drive position a, contamination of the sensor by coals and the like is more preventable than it is connected with the lower hydraulic motor 307b, 308b. Further, since the comparison value $V_1$ 0.9 with 10% margin is chosen instead of 1.0, small variations of actual operational velocity $V_x$ can be tolerated, preventing unnecessary emergency stopping.

This third aspect of the present invention is not limited to those structures described above, but some variations and modifications will be acceptable. For example, the location of each drive position (a, b and the like) may be changed. Though the transfer state of the circulating bucket conveyer is transformed into the operational velocity of the hydraulic motor and detected by the speed sensor in the present embodiment the state may be transformed, for instance, into the output torque of the hydraulic motor and detected by a torque sensor. Or it may be transformed into the amount of oil flow being supplied to the hydraulic motor, which is then detected by a flow meter.

In sum, the arrangement of the third aspect of the present invention prevents the buckets from dropping the load in emergency improving safety and making the operation more reliable.

Next, a preferred embodiment of the fourth aspect of the present invention will be described in accordance with the accompanying drawings (FIG. 16–FIG. 19).

Figure 16:
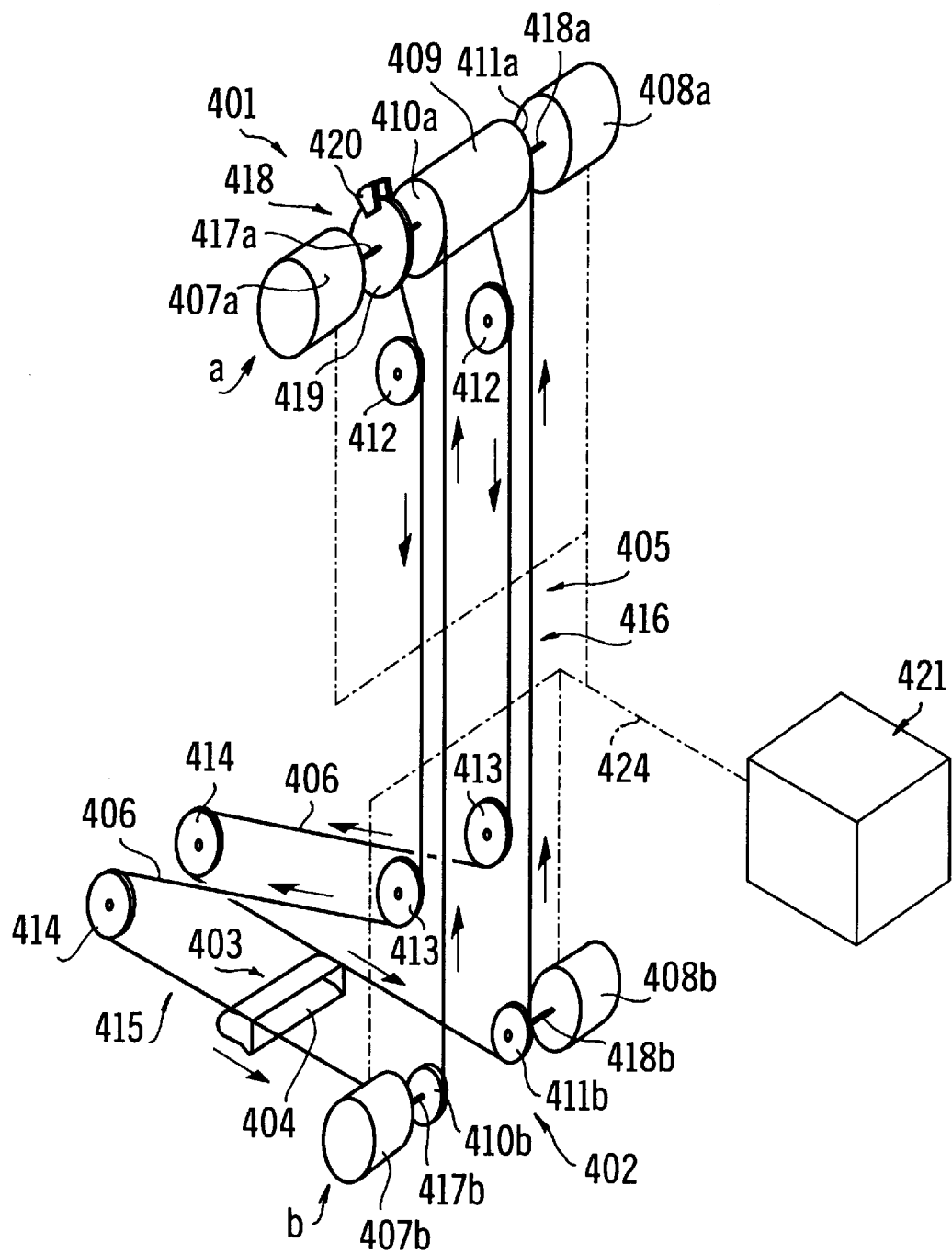
FIG. 16 is a perspective view of the continuous unloader shown in FIG. 15.

A continuous unloader according to the fourth aspect of the present invention is shown in FIG. 16. The continuous unloader 401 is connected to the free end of a boom (not shown) provided on a dock (not shown). The unloader 401 puts a digging portion 402 located at its lower part into a hold (of a ship, not shown), and digs bulk cargoes such as iron ore and coals off with buckets 404 of a bucket conveyer 403. The bulk cargoes dug into the buckets 404 are lifted up through an elevator portion 405 by the bucket conveyer 403 circularly moving in the direction indicated by the arrows in FIG. 16, and eventually transferred to the dock by way of a table feeder, a conveyer and the like.

The bucket conveyer 403 includes: a pair of endless chains 406 arranged with a distance between them; and a plurality of buckets 404 (only one of them is shown) which transversely links the paired chains with a predetermined distance between any two buckets. The digging portion 40(2 horizontally extends from the bottom end of the elevator portion 405. The elevator portion 405 has a vertically extended structure. The top position and the bottom position of the elevator portion 405 are respectively designated as an upper drive position and a lower drive position 1) at which the bucket conveyer 403 is driven. Hydraulic motors 407a, 408a, 407b, 408b for substantially driving the bucket conveyer 403 are provided at the upper drive position a and the lower drive position b, respectively.

At the upper drive position a, the upper hydraulic motors 407a, 408a are provided in a way that they face each other. At each end of a drum member 409, each drive shaft 417a, 418a of the upper hydraulic motors 407a, 408a is integrally and coaxially connected, achieving a coaxial operation of the motors 407a, 408a at an eqaul velocity. Each upper sprocket 410a, 411a is integrally provided on each end of the drum member 409 and the top portion of each chain 406 is taken up on each of the sprockets 410a, 411a. The bucket conveyer 403 is driven by the upper hydraulic motors 407a, 408a.

At the lower drive position 1, the lower hydraulic motors 407b, 408b are provided in a way that they face each other. A lower sprocket 410b, 411b is provided on each associated drive shaft 417b, 418b of the hydraulic motors 407b, 408b. These lower sprockets 410b, 411b are situated vertically right under the upper sprockets 410a, 411a along the elevator port ion.

Each lower sprocket 410b, 411b takes up each of the paired chains 406, 406, allowing the lower hydraulic motors 407, 408b to drive the bucket conveyer 403. It should be noted that each hydraulic motor 407b, 408b has its own drive shaft 417b, 418b and is independently driven at an equal velocity. However, the lower hydraulic motors 407b, 408b are operated synchronously with the upper hydraulic motors 407a, 408a.

Each of the paired chains 406 of the bucket conveyer 403 is guidedly taken up not only by the sprocket 410a, 411a, 410b, 411b but also by a top idle sprocket 412 provided at the top end of the elevator portion 405, an intermediate idle sprocket 413 provided on the boarder between the elevator portion 405 and the digging portion 402, and by a lower idle sprocket 414 provided at the top end of the digging portion 402. These idle sprockets 412, 413, 414 are slaved by the chains 406 and rotated according to the circulation of the chains 406.

The bottom 415 of the bucket conveyer 403 lying between the lower idle sprockets 414 and the lower sprockets 410a, 411b forms a substantial part of the digging portion for digging the cargoes off, and this bottom 415 horizontally, extends with a right angle against the lifting-up section 416 of the elevator portion 405 of the bucket conveyer 403. The bucket conveyer 403 circulates through these sprockets described above in the direction indicated by the arrows. The continuous unloader 401 further includes three jacks (not shown): an extensible jack for transferring the lower idle sprocket 414 toward/away from the lower sprockets 410b, 41 1b in a small distance; a jack for adjusting the posit ion of the intermediate idle sprocket 413 so that it can absorb the slack/extension of the chains 406 generated by the movement of the lower idle sprockets; and a tilting jack for making the bottom 415 tilt against the lifting-up section 416. These jacks allow the digging portion 402 or the bottom 415 to appropriately change its positions, size and the like according to the actual situation of digging the cargoes.

In addition, a brake mechanism (a brake means) 418 is provided on a drive shaft 417a of one of the upper hydraulic motors 407a at the upper drive position a. The brake mechanism 41 or stops the bucket coveyor 403 when the unloader stops its operation. The brake mechanism 418 of the present embodiment is a disc-brake mechanism which includes a disc 419 mounted on the drive shaft 417a and at caliper mechanism 420 fixed on a frame (not shown). The caliper mechanism 420 encloses brake pads which are mechanically operated and automatically clamp the disc 419 in the instant of the unloader's 40)1 stopping. The operation above enables constraining the drum member 409 and thus restricting the movement of the bucket conveyer 403. Accordingly, when the unloader 401 is stopped, the bucket conveyer 403 freezes at that position without spilling the cargoes out of the buckets 404.

The unloader 401 is provided with an oil pressure distributing portion (means) 421 for appropriately, distributing oil pressure. The oil pressure distribution portion 421 is linked with each hydraulic motor 407a, 400a, 407b, 4081) by way of hydraulic circuit 424. The details will be described hereinafter.

Figure 15:
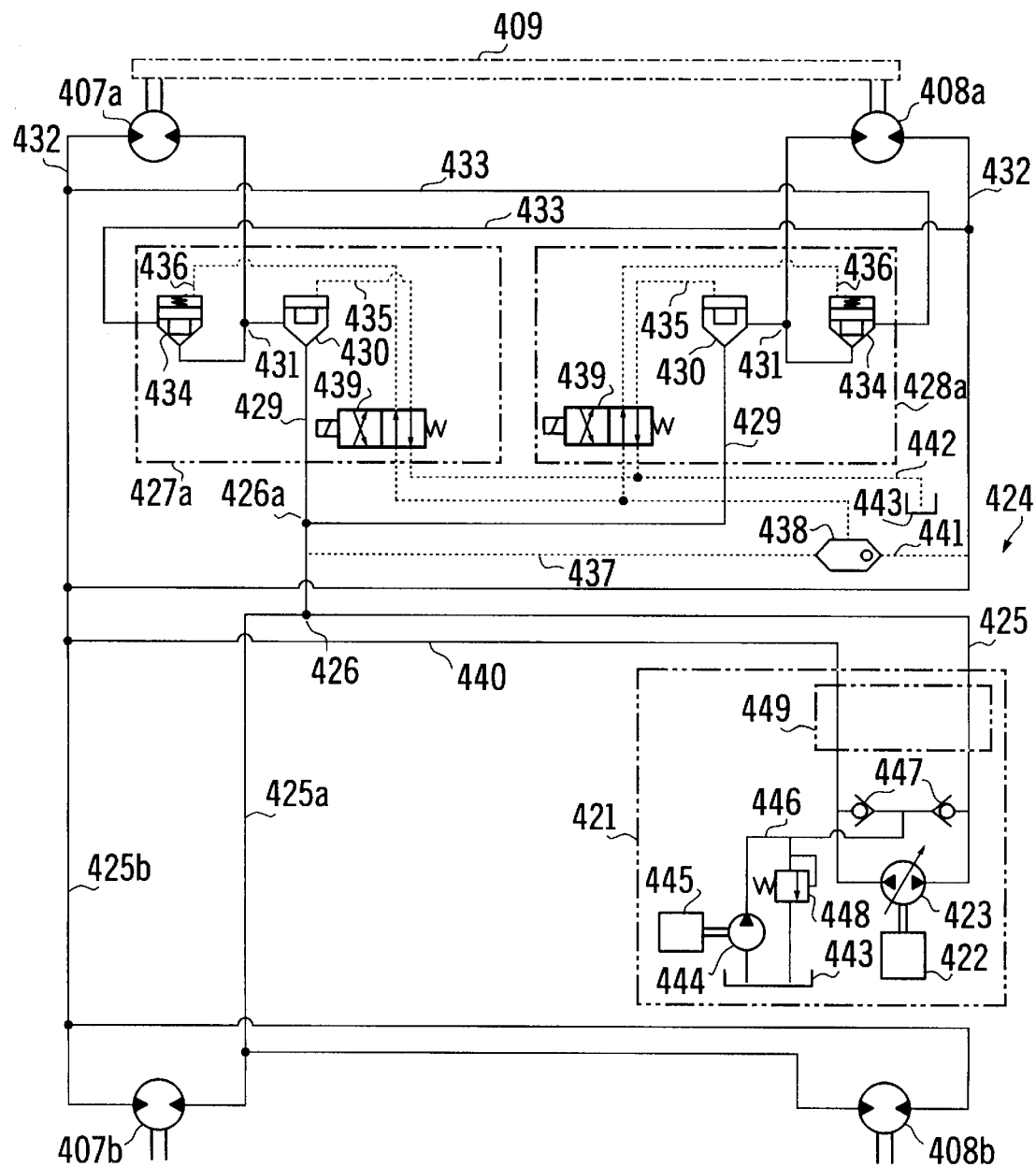
FIG. 15 is a hydraulic circuit diagram of a continuous unloader of a preferred embodiment of the fourth aspect of the present invention, showing a state which relatively heavy load is transferred.

FIG. 15 shows a circuit diagram of the oil distribution paths of the unloader 401 which includes the oil pressure distributing portion 42 1, hydraulic circuit 424, and the hydraulic motors 407a, 408a, 407b, 4)8b. The upper hydraulic motors 407a, 408a are shown at the top of the drawing, while the lower hydraulic motors 407b, 408b are shown at the bottom. The drawing indicates a state in which the unloader is carrying relatively heavy load such as iron ore. The upper oil pressure 407a, 408a are coaxially coupled with a drum member 409 (schematically shown).

The oil pressure distribution portion 421 includes an electric motor 422 and a hydraulic pump 423 which is directly coupled with the electric motor 422. The electric motor 422 is operated at a constant speed which is independent of loading condition of the buckets, for rotating a shaft of a hydraulic pump 423. The hydraulic pump 423 is generally a variably delivery pump, and a swash plate type piston pump is especially adopted in the present embodiment. More precisely, the shaft of the hydraulic pump 423 directly coupled with the electric motor 422 is provided with a swash plate, which swash plate causes the reciprocal movement of pistons for distributing pressurized oil. The controller controls the angle of the swash plate so that the amount of the pressurized oil flow to be distributed from the hydraulic pump 423 can be varied.

The hydraulic oil pressurized by the hydraulic pump 423 is distributed to a high pressure path 425 connected to the exit of the pump 423, and after divided at a branch point 426 a branch is directly distributed through at path 425a to each of the lower hydraulic motors 407b, 408b. On the other hand, another branch point 426a is provided on the upper hydraulic motors' 407a, 408a side. And between the branch point 426a and the upper oil pressure motors 407a, 408a, switch components (means) 427a, 428a are provided for selectively stopping oil pressure distribution to each of the upper oil pressure motors 407a, 408a by switching on/off the hydraulic circuit.

The switch components 427a, 428a are respectively provided for the upper hydraulic motors 407a, 408a. Since the two components share a similar structure, the details will be described on only one switch component 427a and those on another will be left out with designating like reference numerals to like structural elements.

The branch point 426a is connected with the upper hydraulic motor 407aby way of the branch point 429, and a first switch valve 430 is located next to the branch point 429. Another branch point 431 is provided on the down stream side of the first switch valve 430, and the branch point 431 is connected with a low pressure path 432 on the exit side of the other upper hydraulic motor 408a by way of a low pressure circulation path 433. A second switch valve 434 is provided on the midway of the low pressure circulation path 433.

The first and the second switch valves 430, 434 and what is called logic valves and they are adapted to open/close when high pressure is selectively introduced from each high pressure control path 435, 436. The high pressure introduced into all introduction path 437 from a section of the high pressure path 425 between the branch point 426 and the branch point 426a is transferred to a control switch valve 439 by way of a valve 438. The high pressure from the control switch valve 439 is introduced into either one of the first switch valve 430 or the second switch valve 434. The valve to which the high pressure has been introduced closes, while the other valve to which the high pressure has not been introduced opens. In a state illustrated in FIG. 15, the first switch valve 430 is open while the second switch valve 434 is closed. This state allows the high pressure to be eventually distributed to the upper hydraulic motor 407a, driving it for rotation.

Though the first and the second switch valves 430, 434 are represented by simple symbols in FIG. 15 for easier understanding, those symbols represent the same switch valve shown in FIG. 19 and the two types of the symbols may be swapped with each other.

In the other switch component 428a, the first switch valve 430 is open while the second switch valve 434 is closed just as they are in the switch component 427a, allowing the high pressure to be distributed to the other hydraulic motor 408a. Thus, both of the upper hydraulic motors 407a, 408a are now being driven for rotation. In this state, the lower-hydraulic motors 407b, 408b are also being driven so that the unloader can carry relatively heavy load such as iron ore with using all of the four hydraulic motors 407a, 408a, 407b, 408b.

The hydraulic oil which becomes low pressurized after being used for driving the lower hydraulic motors 407b, 408a returns to the hydraulic pump 423 through a path 425b and the low pressure path 440. On the other hand, the hydraulic oil which becomes low pressurized after being used for driving the upper hydraulic motors 407a, 408a returns to the hydraulic pump 423 through the low pressure path 432 on the exit side of the motor 407a and the low pressure path 440. Herein the low pressure oil flowing through the low pressure path 432 on the exit side of the motor 407a sneaks into the low pressure circulation path 433 but is blocked by the second switch valve 434. The low pressure oil also sneaks into the low pressure control path 441, but is blocked by the valve 438. Further, the hydraulic oil which leaks when the first 430 and the second 434 switch valves are open is retrieved to the tank 443 through a leak path 442.

In addition, a supplementary hydraulic pump 444 is provided in order to supply the hydraulic oil as much as is lost due to leaking from the hydraulic pump 423 and the hydraulic motors 407a–408b. The supplementary hydraulic pump 444 also keeps the oil temperature within a certain range. This pump 444 constantly discharges at fixed amount of the hydraulic oil and is driven by an electric motor 445 like the main hydraulic motor 423. The supplementary hydraulic pump 444 discharges the hydraulic oil up from the tank 443 and distributes it through a supplementary path 446 to the low pressure path 440. In case that the main hydraulic pump 423 stopped working, the supplementary pump 444 can supply the hydraulic oil to the high pressure path 425 through check valves 447. The additionally supplied oil pressure is kept within a certain range with a relief valve 448. An assistant component 449 is also provided which includes bypass valves for maintenance and other purposes, shut-off valves for long term stoppage, and the like.

In the arrangement above, varying the amount of the oil which flows from the hydraulic pump 423 changes the operational or rotational velocity, of the hydraulic motor 407a, 408b and thus changes the transfer velocity of the load. When relatively heavy load such as iron ore is transferred, all of the four hydraulic motors 407b–408b may be driven so that the maximum drive force or operational torque be obtained. Since the hydraulic pump 423 achieves its highest operational efficiency when it experiences the maximum flow of the oil, and since its efficiency is in proportion to its transfer velocity, the pump 423 is operated normally at its maximum speed and with its maximum torque.

However, if relatively light load such as coals (coals weigh about one third of iron ore) is transferred when the hydraulic pump 423 is working at its maximum speed and torque, the torque which would be adequate for heavy load becomes unnecessarily large for such light load given that other conditions (transfer velocity, transfer volume) remain the same. In order to make the unloader 401 flexibly achieve the maximum operational efficiency in any loading conditions, the unloader 401 will be operated in such a manner that it can make the best use of excess torque for increasing its operational efficiency. This will be described hereinafter.

Figure 17:
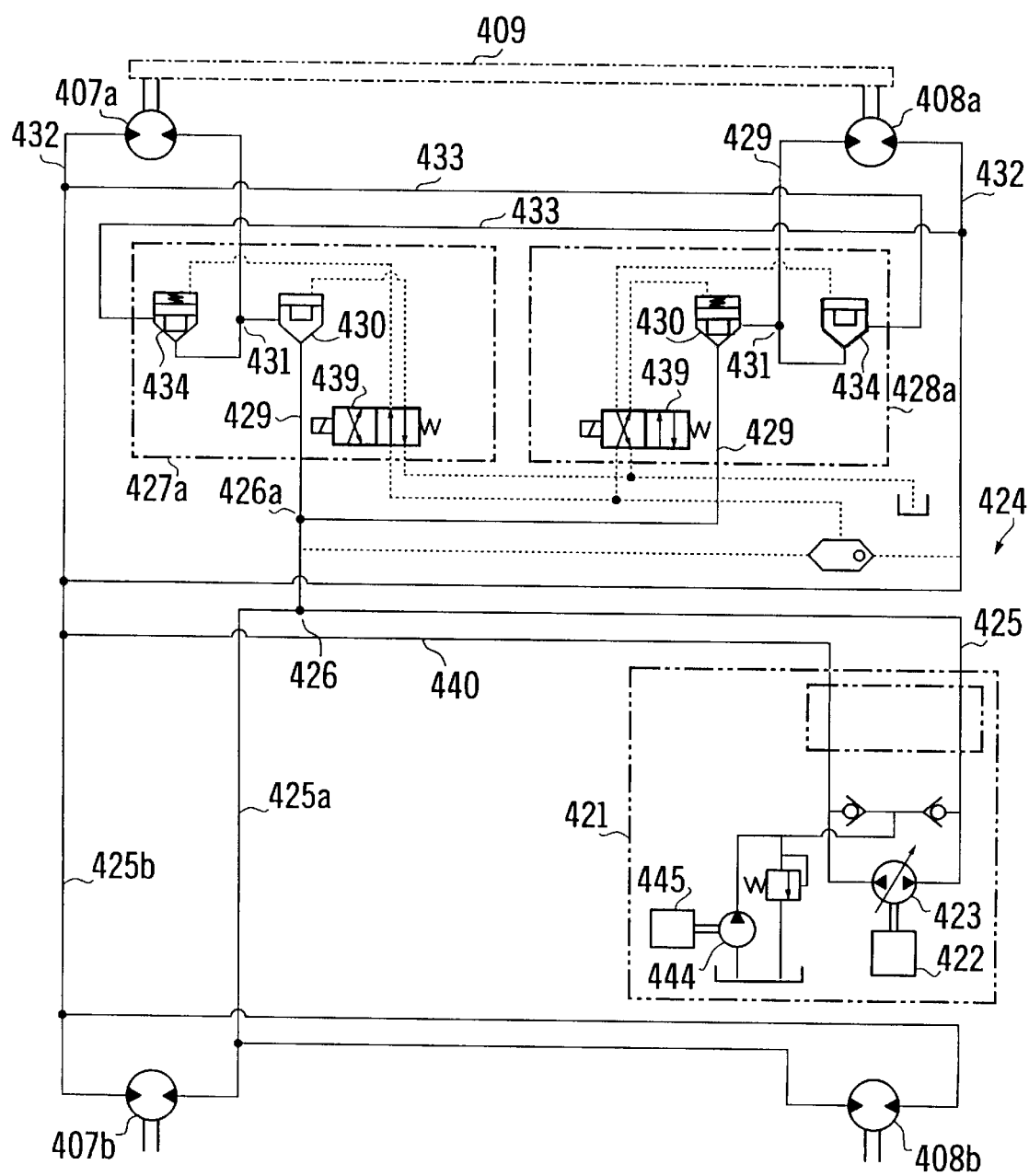
FIG. 17 is a hydraulic circuit diagram of the continuous unloader mentioned in FIG. 16, showing a state in which relatively light load is transferred.

FIG. 17 shows a circuit diagram of the hydraulic circuit which is similar to what FIG. 15 shows. But this time it illustrates a state in which relatively light load is being transferred. In the switch component 428a (the switch component on the right side) the control switch valve 439 has been switched into a new position, resulting in the first switch valve 430 closed while the second switch valve 434 open. In this situation the highly pressurized oil is not distributed to the hydraulic motor 408a, and the motor 408a substantially stops because it fails to be driven. However, the low pressure oil from the upper hydraulic motor 407a on the opposite side flows to the low pressure path 432 on the exit side, by way of the low pressure circulation path 433, the second switch valve 434, the branch path 429 which links the branch point 431 with the hydraulic motor 408a, and the motor 408a. That is, the low pressure oil circulates through a loop formed by these paths and allows the hydraulic motor 408a to be driven by the hydraulic motor 407a.

When the switch component 428a is switched as above, the oil from the hydraulic pump 423 flows into three hydraulic motors 407a, 407b, 408b instead of four motors 407a, 408a, 407b, 408b. Then each of the three hydraulic motors 407a, 407b, 408b can gain more oil supply and increase their rotational velocity. On the other hand, the total of the generated torque is decreased since the number of the motor has been reduced from four to three, wherein each hydraulic motor 407a–408b is subjected to an equal torque. But the reduced total torque does not cause any problems because the load is relatively light, and the unloader 401 is capable enough to carry it. That is, when the load is relatively light, the number of the hydraulic motors that actually operate for supplying oil pressure can be reduced so that less torque be generated but the maximum operational velocity be raised. Thus, the operational efficiency can be improved.

Figure 18:
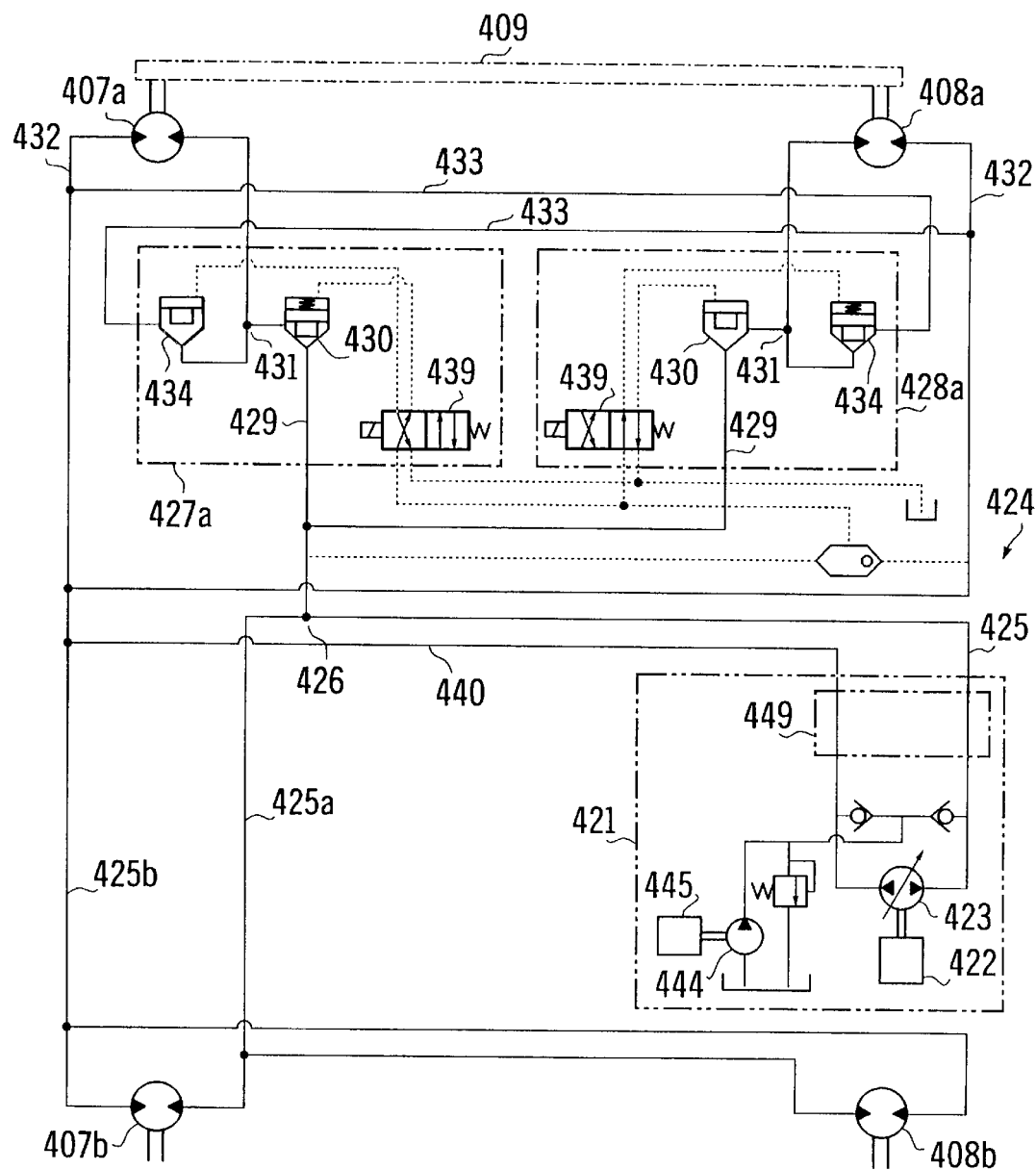
FIG. 18 is a hydraulic circuit diagram of the continuous unloader illustrated in FIG. 16, showing another state in which relatively light load is transferred.

Another state in which relatively light load is being transferred is shown in FIG. 18, wherein the hydraulic motor 408a which was stopped in the previous state is now driven while the hydraulic motor 407a on the opposite side is substantially stopped. That is, in this state the control switch valve 439, the first switch valve 430 and the second switch valve 434 in each switch component 427a, 428a are all oppositely switched compared with the previous state (FIG. 17).

Only one of the upper hydraulic motors 408a is driven in this state as is in the previous state, therefore resulting in the same effect as the previous one. In the case of transferring light load, using each upper hydraulic motor 407a, 408a for appropriate hours or days in turn increases their durability, preventing them from shortening their lives.

As described above, the unloader is adapted to increasing its operation velocity by substantially stopping some of the hydraulic motors. Some modifications may be acceptable in the various circuit arrangements, the location of the hydraulic motors, the structure of the switch valves and the like. That is, the present invention is not limited to the structure described above.

In sum, the fourth aspect of the present invention enables changing the operation velocity according to the weight oft the load, improving the operational efficiency.

A preferred embodiment of the fifth aspect of the present invention will be described in details in accordance with the accompanying drawings. A schematic view of a continuous unloader 501 according to the present embodiment is shown in FIG. 20. The continuous unloader 501 includes: an elevator portion 503 supported at the end of a boom (not shown) by way of a top support frame 502 in a way that the elevator casing plums down from the boom and can freely rotate about its vertical axis; a digging portion 504 horizontally extending from the bottom of the elevator portion 503; and a bucket conveyer 505 which circulates through the elevator 503 and the digging 504 portions.

A pair of upper sprockets 507 and a pair of lower sprockets 508 on which chains 506 of the bucket conveyer 505 are taken up are provided at upper and lower positions of the elevator portion 503, respectively. An upper hydraulic motor 509 is provided on each end of a common rotary shaft of the upper sprockets 507, while a lower hydraulic motor 510 is provided on a distal end of the associated rotary shaft of each lower sprocket 508.

Figure 21:
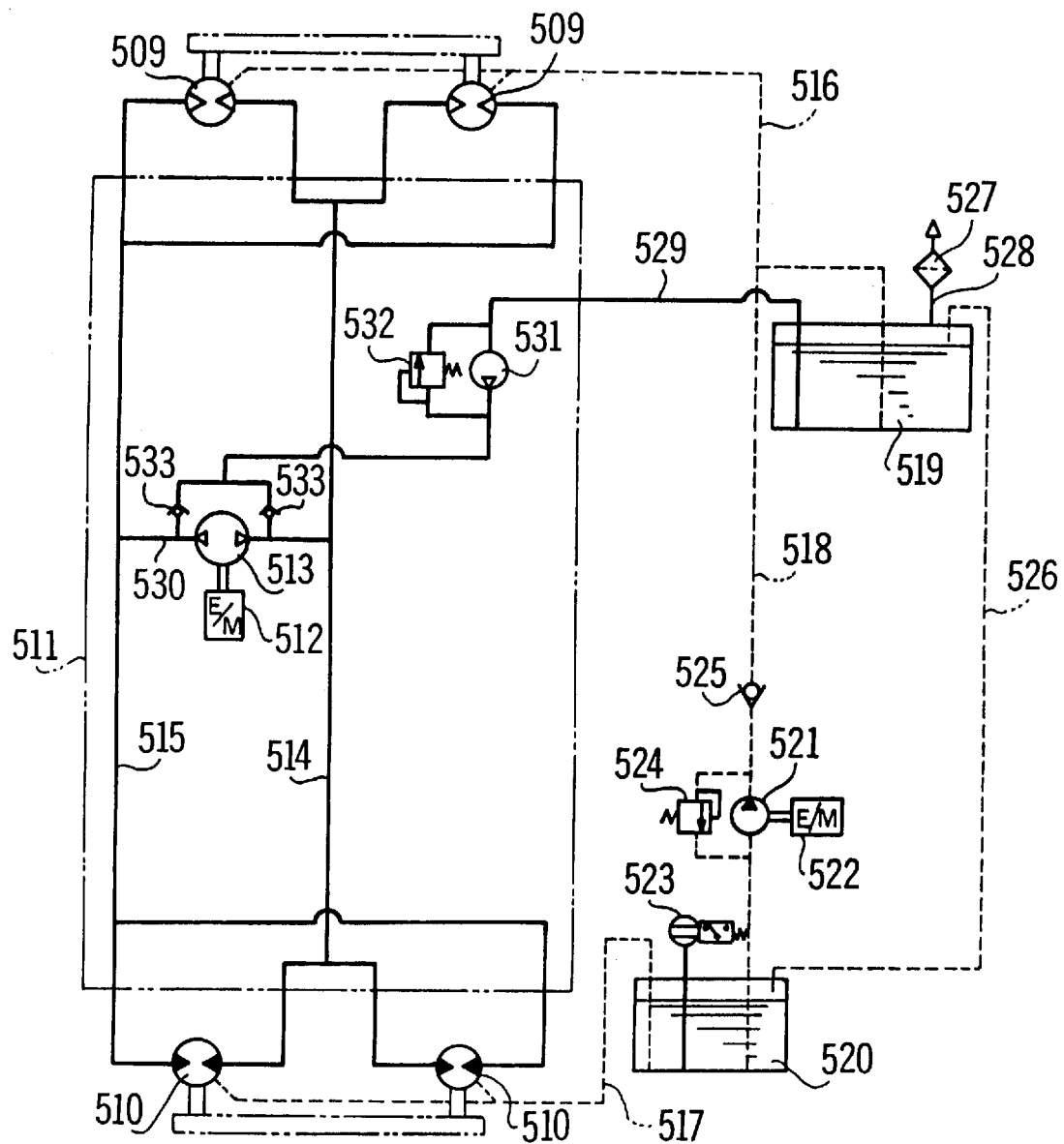
FIG. 21 is a schematic view of a drain circuit of the continuous unloader shown in FIG. 20.

These hydraulic motors 509, 510 are synchronously driven by hydraulic circuit 511 shown in FIG. 21. That is, the hydraulic motors 509, 510 are connected with each other by way of a hydraulic pump 513 and branch pipes 514, 515, wherein the hydraulic pump 513 is driven by an electric motor 512. The oil flowing out of the hydraulic pump 513 is distributed through one of the branch pipe 514 to each of the hydraulic motors 509, 510 under an equal pressure, while the oil from the motors 509, 510 flows back to the hydraulic pump 513 through the other branch pipe 515.

Herein it is unavoidable that some amount of the oil physically leaks from each of the hydraulic motors 509, 510. The drain (leak oil) is brought to a main tank 519 provided in the top support frame 502 through drain pipes 516, 517, 518. That is, drain exits of the hydraulic motors 509, 510 are linked with the main tank 519 by way of the drain pipes 516, 517, 518.

More precisely, the drain exit of the upper oil l pressure motor 509 is directly linked with the main tank 519 by way of the first drain pipe 516. On the other hand, the drain exit of the lower hydraulic motor 510 is linked with an intermediate tank 520 which is provided nearby the lower hydraulic motor 510 by way of the second drain pipe 517. The intermediate tank 520 and the main tank 519 are linked by way of the third drain pipe 518. A drain pump 521 is provided on the third drain pipe 518.

The intermediate tank 520 is positioned vertically upward the lower hydraulic motor 510 in a way that the head (or drain) pressure resulting from the height between the intermediate tank 520 and the lower hydraulic motor 510 does not exceed the pressure limit (3 kg/cm$^2$) which is the maximum pressure that an oil seal portion of the lower hydraulic motor 510 can tolerate. The height described above may be about 10 m. Further, the intermediate tank 520 has a much smaller volume (about 50 liter) than the main tank (about 1000 liter) so that it not be an obstacle when bulk cargoes are dug.

The drain pump 521 is driven by an electric motor 522. The electric motor 522 is controlled by a controller (not shown) and is driven when the oil in the intermediate tank 520 reaches a predetermined level, but is stopped when the oil goes down below the level. The motor 522 is stopped in the latter case because it is not desirable to operate the drain pump 521 with no load (oil). The level of the oil in the intermediate tank 520 is detected by a level switch 523 provided in the tank 520.

The oil pumped up by the drain pump 521 has its pressure adjusted to a predetermined pressure (5 kg/cm$^2$) by a regulator 524 which is provided on the third drain pipe 518 in parallel with the drain pump 521. The oil is then sent to the main tank 519. A check valve 525 for preventing the oil from reversely flowing from the main tank into the intermediate tank 520 is provided on the third drain pipe 518 which upwardly extends from the drain pump 521.

Further, the intermediate and the main tanks 520, 519 are linked through an air communicating pipe 526. In case the drain pump 521 is broken, the air communication pipe 526 can function as an emergency bypass for introducing the oil in the intermediate tank 520 into the main tank 519 by using only the drain pressure of the lower hydraulic motor 510 as drive force. That is, in case the drain pump 521 is broken, the drain from the lower hydraulic motor 510 which has filled the intermediate tank 520 up is pressurized by the drain pressure of the lower hydraulic motor 510, and then is introduced into the main tank 519.

In the situation above, the oil seal portion may receive a pressure which is higher than the pressure limit (3 kg/cm$^2$) because of the extra height between the intermediate tank 520 and the main tank 519. This will especially be the case if the main tank is located at a high position. But this high pressure will be harmless if the operation is stopped before long. Thus, in case the drain pump 521 is broken, the lifting capacity is not so seriously affected. Needless to say, the intermediate tank 520 has an airtight structure so that no pressure leakage can occur.

The air communicating pipe 526 also functions as a breath passage of the airtightly formed intermediate tank 520. More precisely, the air in the intermediate tank 520 communicates with the air in the main tank 519 through the air communicating pipe 526 and the air flows from the intermediate tank into the main tank (or reversely) according to the movement of the oil surface level in the intermediate tank 520. The air in the main tank 519 communicates with the outside air through a breath pipe 528. The breath pipe 528 has a filter and is provided in the main tank 519. Further, the oil inside the intermediate tank 520 can be shielded from the dust of the bulk cargoes such as coals during the operation since the intermediate tank 520 is airtightly formed.

As shown hi FIG. 21, the oil in the main tank 519 is supplied to the oil pressure circuit 511 through a supplying pipe 529. Precisely, the piping 530 nearby the hydraulic pump 513 of the oil pressure circuit 511 is linked with the main tank 519 by way of the supplying pipe 529. The supplying pipe 529 includes a force feed pump 531, a regulator 532 and a check valve 533. With this arrangement, additional oil for compensating the drain oil leaking from the hydraulic motors 509, 510 can be supplied so that the amount of the oil flowing through the oil pressure circuit 511 be always kept constant.

Additionally, a telescopically extensible/retractable digging frame 534, an extensible cylinder 535 for extending/retracting the digging frame 534, a tilting cylinder 536 for making the digging frame 534 tilt, and an elevator cylinder 537 for elevating the digging frame 534 are also shown in FIG. 20. The extensible 535, the tilting 536 and the elevator 537 cylinders are adapted to associatedly extend/retract so that they absorb the slacks of drive chains 506 created by the extension, retraction, tilting and elevation of the digging frame 534.

Next, the function of the present embodiment with the arrangement above will be described.

As shown in FIG. 21, the drain which leaks from the lower hydraulic motor 510 is at first transferred to the intermediate tank 520 through the second drain pipe 517 due to the drain pressure. Then the drain in the intermediate tank 520 is pumped up by the drain pump 521 to the main tank 519 through the third drain pipe 518. The main tank 519 is positioned vertically upward the intermediate tank 520.

According to the arrangement above wherein the drain that leaks from the lower hydraulic motor 510 is pumped up at two separate stages, the oil seal portion of the lower hydraulic motor receives a head (drain) pressure which only results from the height between the lower hydraulic motor 510 and the intermediate tank 520. Since the height mentioned above is determined sufficiently low (approximately 10 m), the oil seal portion of the lower hydraulic motor 510 will not receive a destructively high drain pressure which exceeds the pressure limit (3 kg/cm$^2$) of the portion, eliminating oil leakage.

Accordingly, there will be no requirement of using special, expensive seals with high pressure tolerance for the oil seal portion. A standard type hydraulic motor 510 which allows a lower budget will be enough in this case.

Further, as shown in FIG. 21, the main tank 519 is used as a drain tank of the upper hydraulic motor 509. The oil in the main tank 519 is supplied to the oil pressure circuit 511 through the supplying pipe 529. Since the lower 510 and the upper 509 hydraulic motors share the common hydraulic circuit 511 by which both are driven, the synchronous adjustment of the upper 509 and the lower 510 hydraulic motors becomes easier.

In sum, according to the fifth aspect of the present invention, the drain pressure on the lower hydraulic motor can be kept relatively small even if the elevator portion becomes higher.

What is claimed is:

1. A continuous unloader of a type including a substantially vertically extending elevator portion having a bottom and a top, a digging portion having a first segment downwardly and diagonally extending from the bottom of the elevator portion and a second segment horizontally extending from a free end of the first segment, and a return portion extending from the top of the elevator portion to a free end of the second segment of the digging portion thereby forming an endless route comprising:
    an endless bucket conveyer extending through the endless route;
    a plurality of drive components provided on the conveyer at predetermined positions, the drive components being synchronously driven for driving the conveyer; and
    an endless chain extending along the conveyer and being at least engaged over a first sprocket located at the top of the elevator portion and a second sprocket located at the bottom of the elevator portion, the first and second sprockets being synchronously driven by the drive components to drive the conveyer.

2. A continuous unloader including a vertically extending elevator portion having a bottom and a top, a digging portion extending horizontally, from the bottom of the elevator portion and a return portion extending from the top of the elevator portion to a free end of the digging portion thereby forming an endless route comprising:
    an endless bucket conveyer adapted to carry a substance and extending through an endless route, the conveyer having two sides;
    two endless chains extending along the sides of the conveyer respectively; and
    a plurality of the drive components provided on the drive chains with predetermined intervals between each other in the direction of circulation, each drive component applying a drive power to the conveyer at its position,
    wherein two of the drive components on the two chains which bear the largest force among the drive components while the conveyer is carrying the substance have a common shaft so that the two drive components and the chains be synchronously driven at their positions, while the remaining drive components have two independent shafts respectively so that the two chains be independently driven.

3. A continuous unloader comprising:
    a bucket conveyer circularly driven at two or more drive positions;
    a plurality of drive chains provided at each of the drive positions for driving the bucket conveyer;
    brake means for braking the bucket conveyer;
    a sensor for detecting transfer state of the bucket conveyer circularly driven by the drive means; and
    a controller for stopping the drive means and making the brake means operate when it detects abnormality of the transfer state after processing signals from the sensor.

4. A continuous unloader comprising:
    a bucket conveyer circularly driven at two or more drive positions for transferring a substance;
    at least one hydraulic motor provided at each of the drive positions;
    oil pressure supply means for supplying oil pressure to the hydraulic motor by way of hydraulic circuit; and
    switch means for opening/closing the hydraulic circuit in accordance with weight of the substance being transferred by the bucket conveyer, in order to reduce the number of the hydraulic motors supplying oil pressure.

5. A continuous unloader comprising:
    a bucket conveyer extending vertically and having upper and lower parts;
    hydraulic motors provided at the upper part and the lower part of the bucket conveyer for circularly driving the bucket conveyer;
    an intermediate tank provided near the lower hydraulic motor for temporarily reservoiring drain which leaks from the lower motor; and
    a drain pump for pressurizing the drain in the intermediate tank and sending the pressurized drain to a main tank which is located at a higher position than the intermediate tank,
    wherein the drain is forcibly pushed upward from the lower hydraulic motor to the intermediate tank due to its own drain pressure.

* * * * *

UNITED STATES PATENT AND TRADEMARK OFFICE
CERTIFICATE OF CORRECTION

PATENT NO. : 5,769,206
DATED : June 23, 1998
INVENTOR(S) : Miyazawa, et al.

It is certified that error appears in the above-identified patent and that said Letters Patent is hereby corrected as shown below:

In claim 3, col. 24, line 29, --chains-- should be "means" therefor.

Signed and Sealed this

Sixth Day of October, 1998

*Attest:*

BRUCE LEHMAN

*Attesting Officer*      *Commissioner of Patents and Trademarks*